United States Patent [19]

Bishop et al.

[11] 4,142,243

[45] Feb. 27, 1979

[54] DATA PROCESSING SYSTEM AND INFORMATION SCANOUT EMPLOYING CHECKSUMS FOR ERROR DETECTION

[75] Inventors: Richard L. Bishop, Sunnyvale; William A. Gibson, Cupertino, both of Calif.

[73] Assignee: Amdahl Corporation, Sunnyvale, Calif.

[21] Appl. No.: 798,985

[22] Filed: May 20, 1977

[51] Int. Cl.² .................................................. G06F 11/02
[52] U.S. Cl. .................................... 364/900; 235/304.1
[58] Field of Search ... 364/200 MS File, 900 MS File; 235/302, 303, 303.2, 304, 304.1

[56] References Cited

U.S. PATENT DOCUMENTS

| | | | |
|---|---|---|---|
| 3,098,994 | 7/1963 | Brown, Jr. | 364/200 X |
| 3,474,412 | 10/1969 | Rowley | 235/303.2 |
| 3,573,751 | 4/1971 | De Lisle | 364/900 |
| 3,576,541 | 4/1971 | Kwan et al. | 364/200 |
| 3,719,815 | 3/1973 | Rouse | 364/900 X |
| 3,739,349 | 6/1973 | Burdette, Jr. et al. | 364/900 |
| 3,825,901 | 7/1974 | Golnek, Sr. et al. | 364/200 |
| 3,898,621 | 8/1975 | Zelinski et al. | 364/200 |
| 3,924,181 | 12/1975 | Alderson | 235/302 X |
| 4,039,814 | 8/1977 | Saint-Hilaire et al. | 235/304.1 X |
| 4,059,749 | 11/1977 | Feilchenfeld | 235/302 |

OTHER PUBLICATIONS

R. W. Cook et al., "Design of Self-Checking Microprogram Control" in *IEEE Transactions on Computers*, vol. C-22, No. 3, March 1973, pp. 255–262.

K. M. Helness, "Implementation of a Parallel Cyclic Redundancy Check Generator" in *Computer Design*, Mar. 1974, pp. 91–96.

R. A. Frohwerk, "Signature Analysis: A New Digital Field Service Method" in *Hewlett-Packard Journal*, May 1977, pp. 2–8.

*Primary Examiner*—Melvin B. Chapnick
*Attorney, Agent, or Firm*—David E. Lovejoy

[57] ABSTRACT

A data processing system having a principal apparatus, such as a programmable large-scale data processing system, and a secondary apparatus. The secondary apparatus performs fault detection and analysis on the principal apparatus. The secondary apparatus under control of a secondary program and independently from the principal apparatus, accesses information from different points, such as latch circuits, throughout the principal appartus. The accessed information is utilized by the secondary apparatus to form an actual checksum having a value determined by the accessed information. The actual checksum thus formed is compared with an expected checksum provided from storage by the secondary apparatus. If the actual and expected checksums are different, a fault condition is indicated. An analysis of selected subsets of points in the primary apparatus is made using a compacted scan composed of the values of the selected subset of points.

24 Claims, 8 Drawing Figures

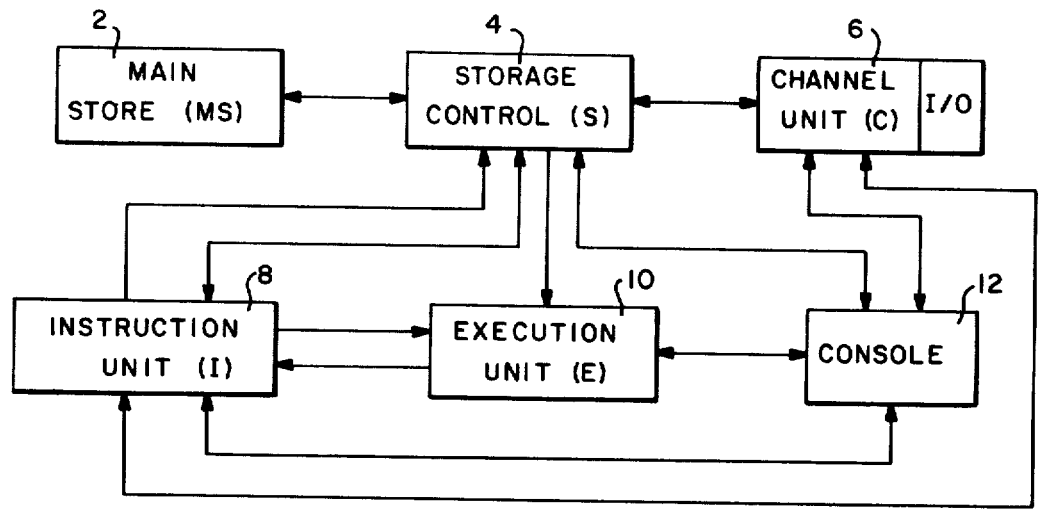
FIG.—1
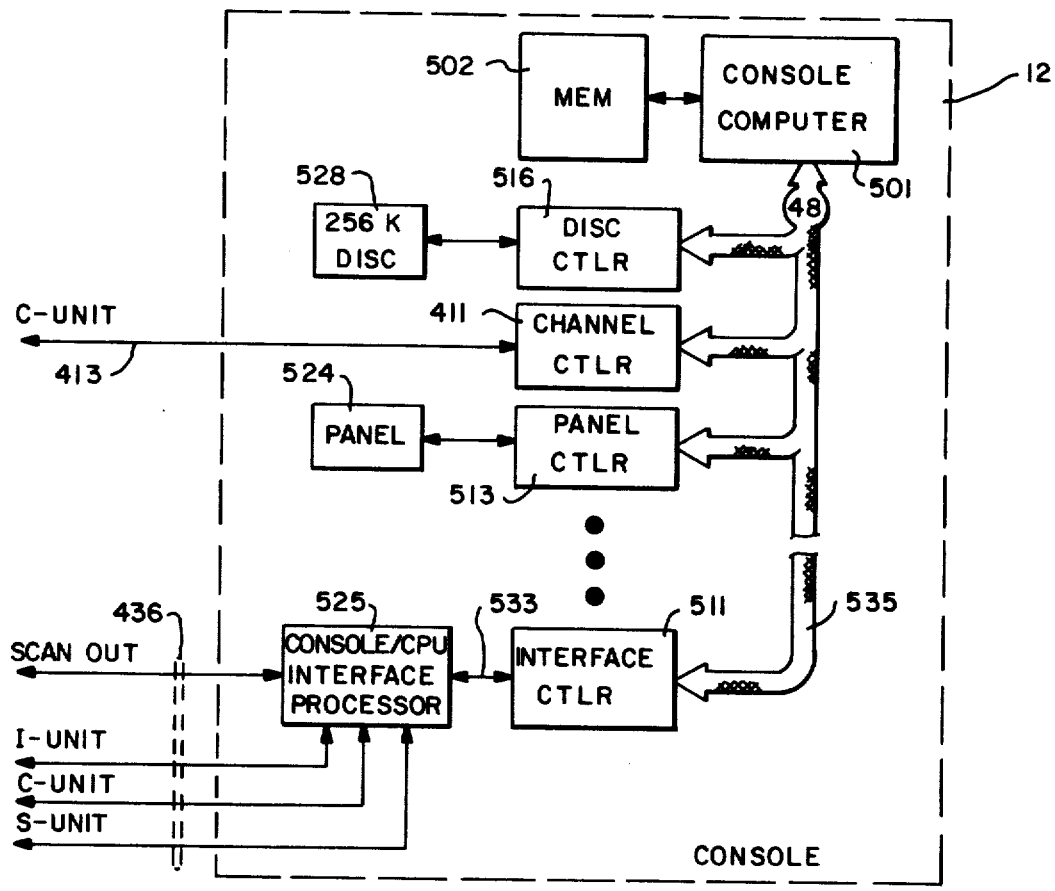
FIG.—2

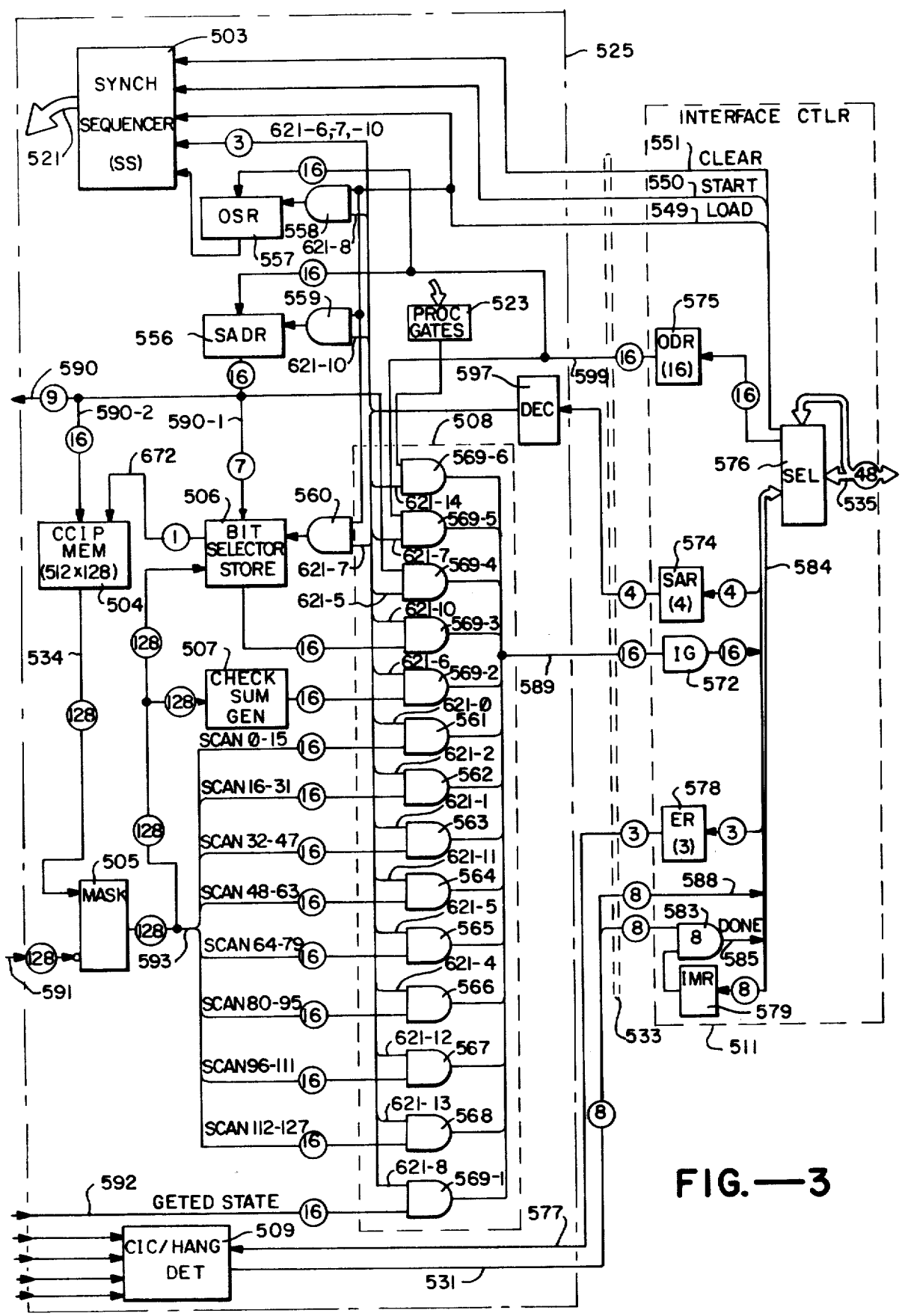
FIG.—3

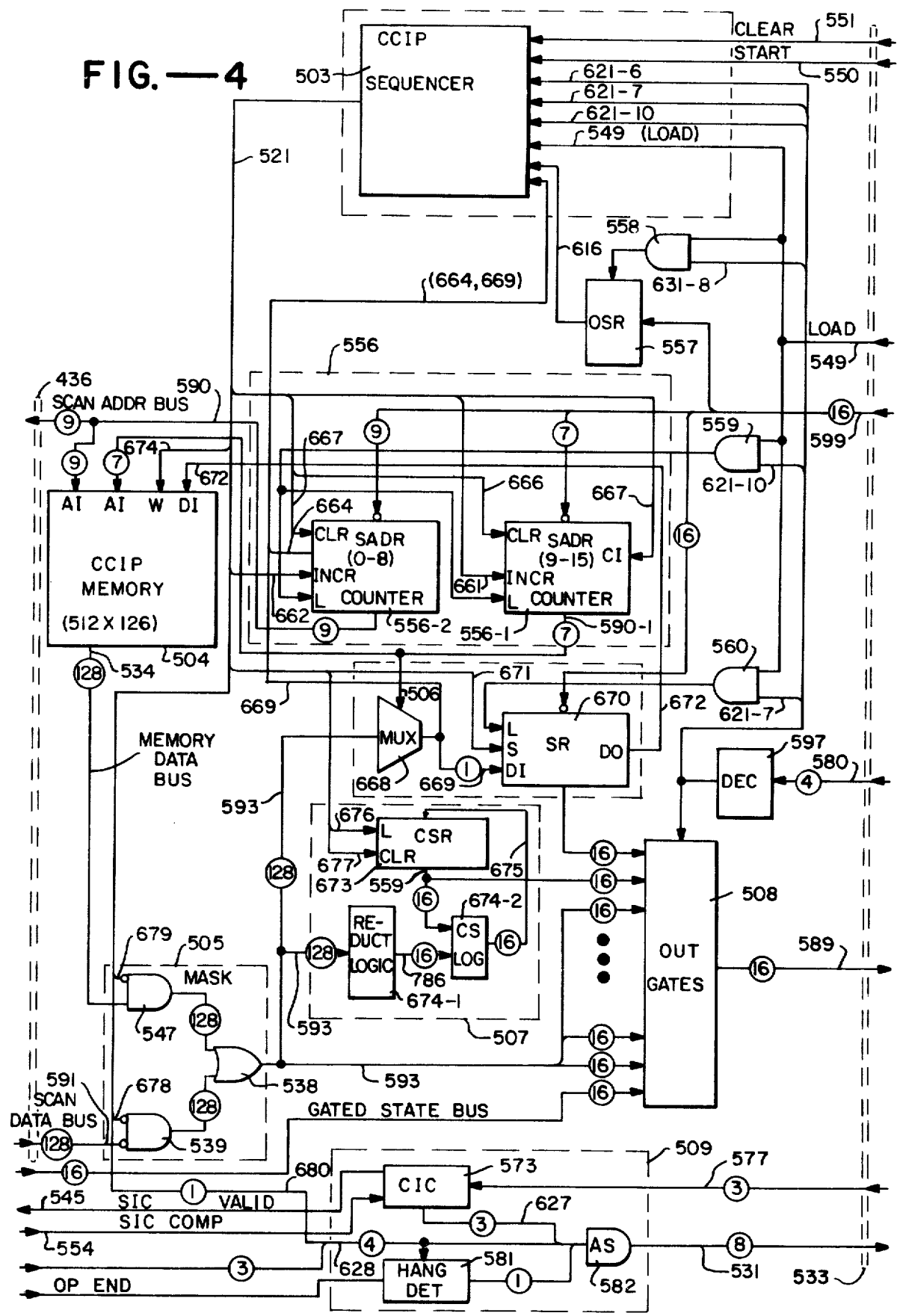
FIG.—4

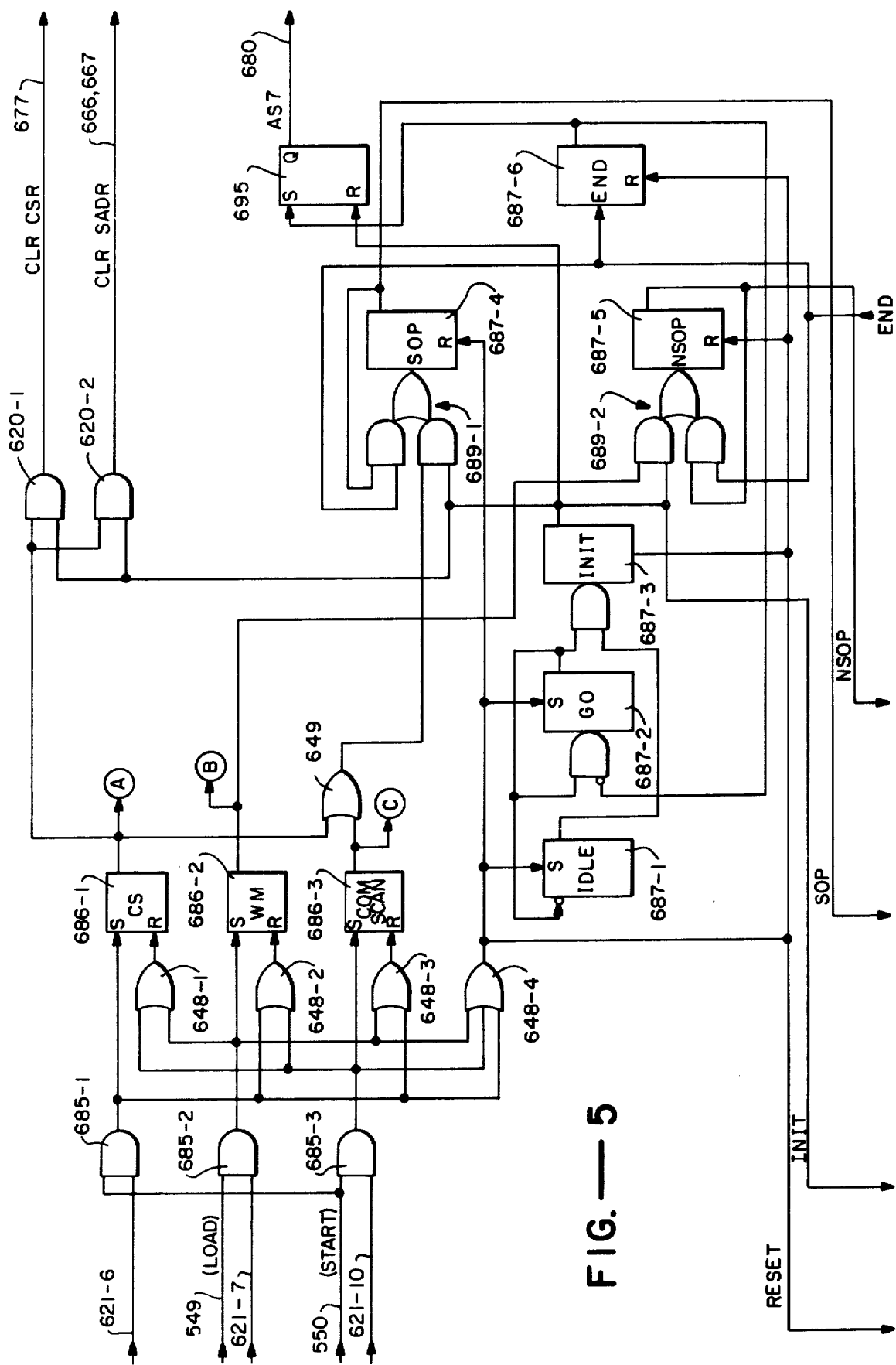
FIG.—5

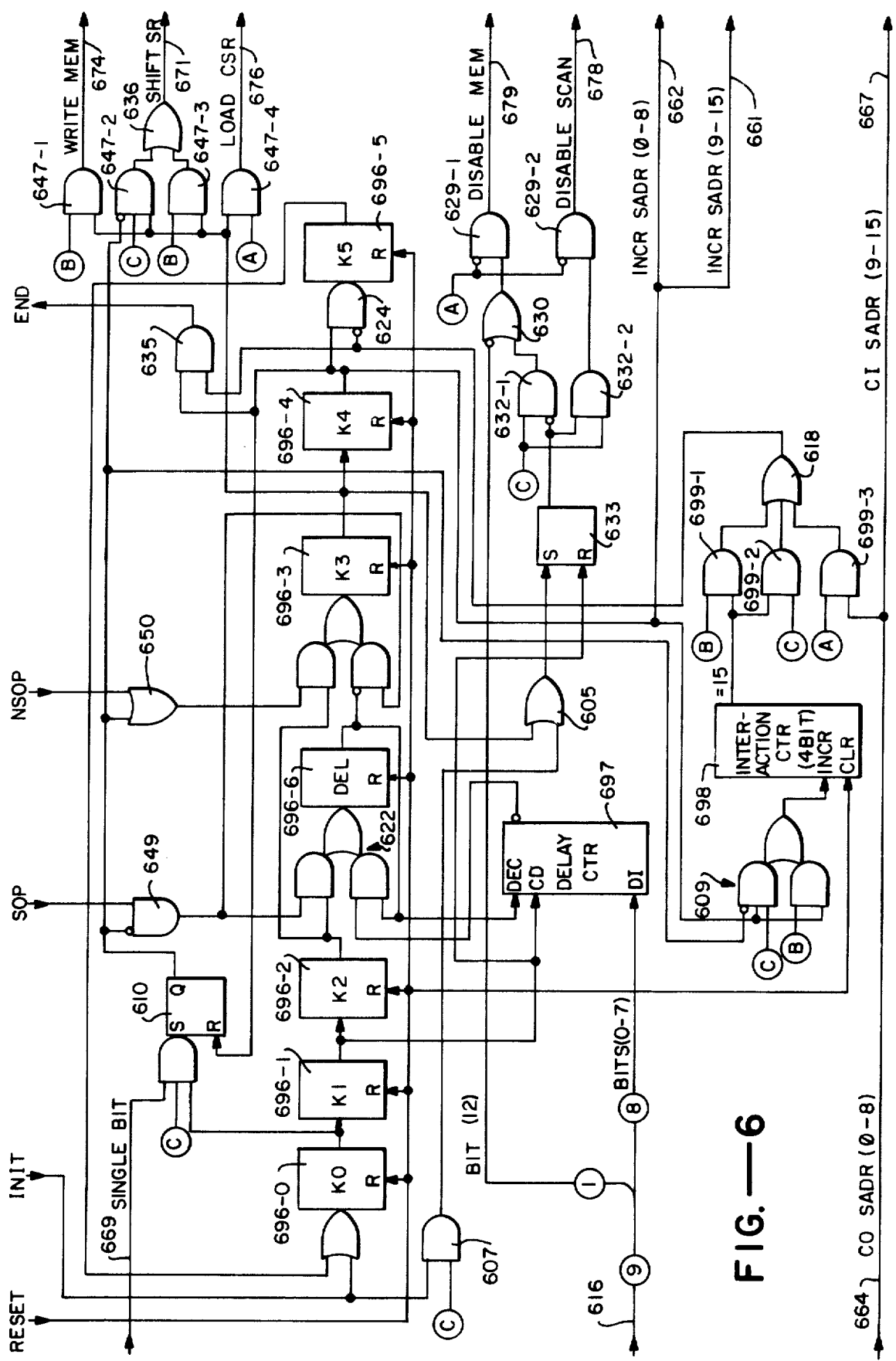

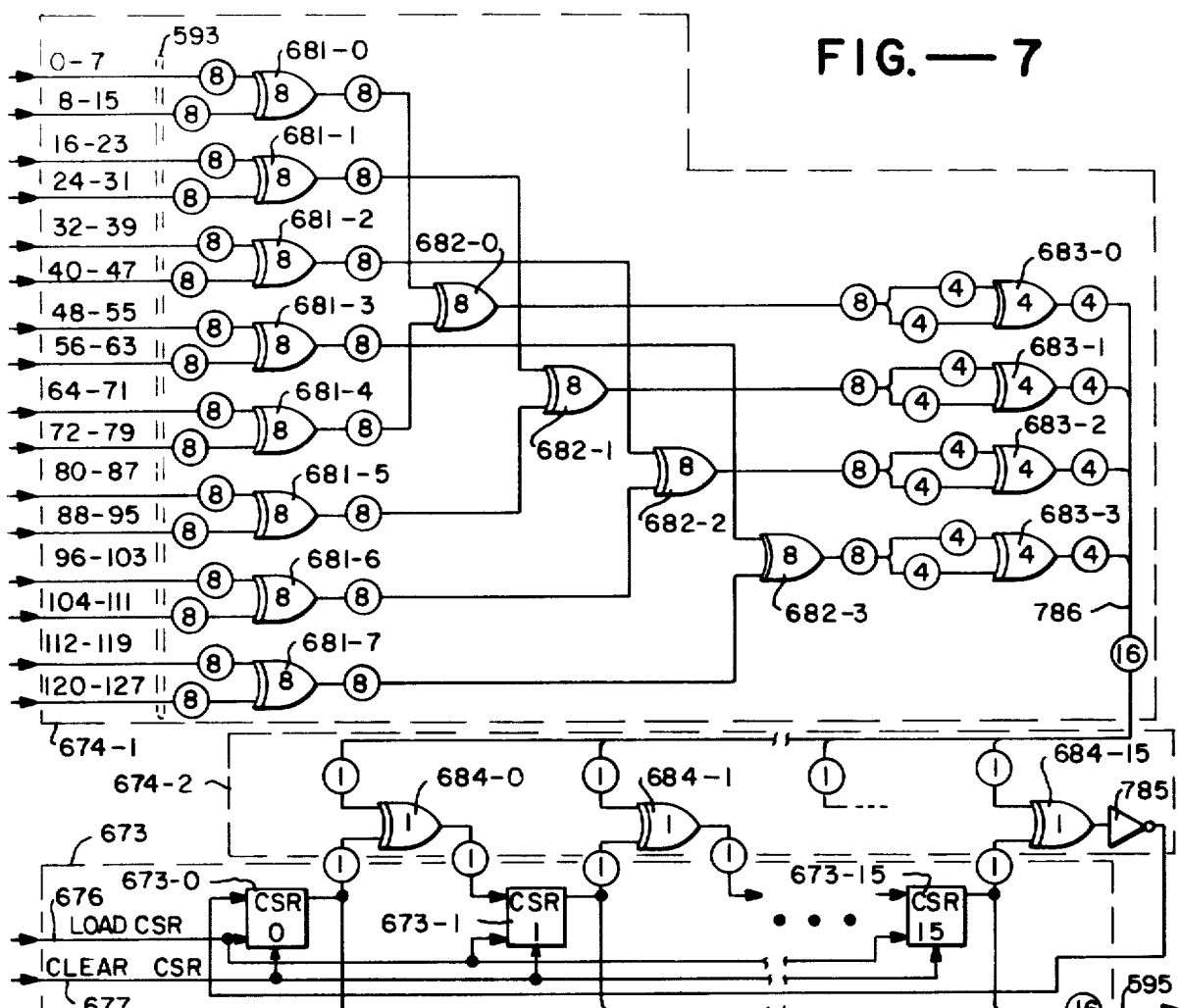
FIG.—7
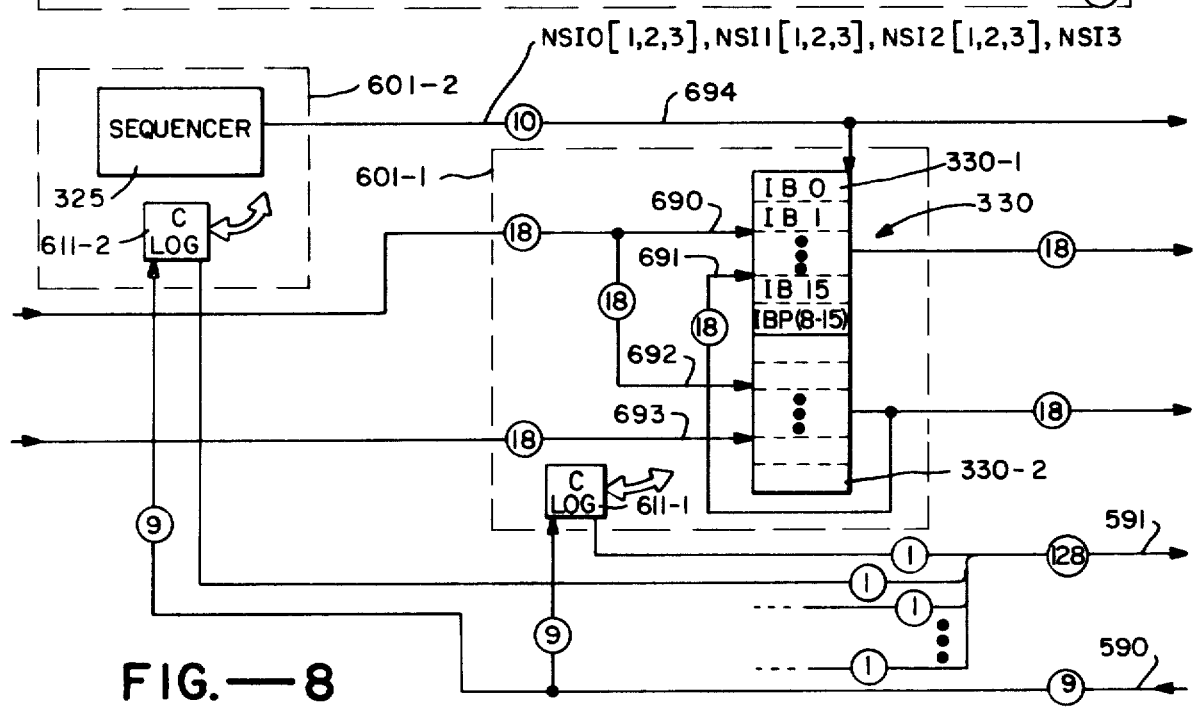
FIG.—8

DATA PROCESSING SYSTEM AND INFORMATION SCANOUT EMPLOYING CHECKSUMS FOR ERROR DETECTION

CROSS REFERENCE TO RELATED APPLICATIONS

1. DATA PROCESSING SYSTEM AND INFORMATION SCAN OUT, Ser. No. 693,551, filed June 7, 1976, invented by Richard L. Bishop and David L. Anderson and assigned to the assignee of the present invention.

2. CONSOLE AND DATA PROCESSING SYSTEM, Ser. No. 693,552, filed June 7, 1976, invented by Richard L. Bishop and David L. Anderson and assigned to the assignee of the present invention.

BACKGROUND OF THE INVENTION

The present invention relates to the field of digital computers and specifically to methods and apparatus whereby the states of latch circuits or other points within a data processing system are accessed for the purpose of fault detection, fault analysis, maintainance and other tasks.

In high-speed, large-scale data processing systems, the ability to detect the state of any latch or other circuit within the data processing system is desirable in order to be able to detect and analyze fault conditions. Prior art systems have frequently direct-wired key points in the data processing system to a control panel or console to illuminate the console lamps and to thereby give an indication of the status of storage circuits within the system. The direct-wired approach, however, becomes unwieldy for large data processing systems because the number of illuminating lamps on the system console becomes too large for useful or convenient operator analysis.

Other prior art systems have employed the computing capability of the data processig system itself to logout data indicating the state of circuits. In order to log-out data, the conventional data paths of the data processing system are employed to store the logged-out data in prescribed locations of system storage. Such a use of the conventional data paths in the data processing system has the problem that, if the data paths or control circuitry associated therewith are faulty, the information logged out is in error so that fault location becomes both difficult and time-consuming.

In order to overcome these problems, the above cross-referenced application entitled DATA PROCESSING SYSTEM AND INFORMATION SCAN OUT provided an improved system for fault detection and analysis. The data processing system disclosed in that application includes a primary apparatus for carrying out principal instruction-controlled data manipulations and includes a secondary apparatus for independently addressing storage locations and other points within the principal apparatus. The secondary apparatus includes an instruction-controlled digital couter which has the capability of accessing information from the primary apparatus and the capability of analyzing the accessed information to identify faults or to carry out other tasks. In that cross-referenced system, the primary apparatus is typically a large-scaled data processing system, such as the AMDAHL 470V/6 system.

The identification of faults in the data processing system of the above cross-referenced application, or more generally in any system, requires the comparison of expected values of information with actual values of information. The presence of differences between expected and actual values indicates that a fault has occurred. The points causing the difference are used to identify the fault. In order to increase the probability of detecting a fault, it is desirable to check a large number of points in the system. In a large-scale data processing system, a comparison of thousands of points are typically required for adequate fault detection and analysis. Furthermore, the address space used to specify the points is usually even much larger than the number of points actually used for fault detection or analysis. The greater the number of points to be compared, however, the more time-consuming are the comparisons and the larger the data base of expected values required. A greater time consumption to detect faults is, of course, undesirable in that such greater time detracts from the efficiency of the data processing system and its availability for more useful tasks. Also, the requirement for a larger data base is undesirable since it requires more storage to store the data base.

While the above cross-referenced application discloses significant improvement in fault detection and analysis, problems still exist when large numbers of points must be examined for fault detection. A need exists for improved methods and apparatus for detecting faults for a large number of points in a data processing system.

SUMMARY OF THE INVENTION

The present invention is a data processing system including principal apparatus for carrying out principal instruction-controlled data manipulations and including secondary apparatus for independently addressing and accessing points within the principal data processing apparatus. The secondary apparatus includes a checksum generator which generates an actual checksum dependent upon the data values of selected points accessed within the principal apparatus. The particular set of points accessed is controlled by the secondary apparatus. The secondary apparatus stores an expected checksum for comparison with the actual checksum. If a comparison indicates that the actual checksum differs from the expected checksum, a fault is indicated within the set of points used in forming the checksum.

Since the set of points which are combined to form a checksum can number in the thousands, and since each checksum contains a much smaller number of bits, a substantial reduction in the number of comparisons of expected and actual values is achieved. This reduction in the number of comparisons enables a much faster detection of faults to occur. If no fault is indicated by comparison of checksums for a first set of points, then no further analysis of that first set of points is required. A new comparison of checksums, for a different set of points or the same set of points at a different time in the principal apparatus, is carried out without need of degrading system performance by further analysis of the first set of points.

Once a fault has been detected through comparisons of actual and expected checksums, it is possible to further analyze the set of points which entered into the checksum to determine what subset of points is the source of the fault. Since the set of points or the subset of points accessed to form a checksum is controllable by the secondary apparatus, the analysis of sets and subsets of points to find faults proceeds in an orderly and rapid fashion.

In accordance with one feature of the present invention, a memory is provided to identify a subset of points in the principal apparatus to be utilized in forming a checksum or for fault analysis. Only those points which are suitably identified in the memory actually contribute to the checksum or to the analysis. All points not suitably identified are ignored. Identification occurs, for example, by storing logicl 0's in the memory locations corresponding one-for-one with selected points in the principal apparatus.

When it is desired to analyze the data values of the subset of points identified in the memory, a compacted scan of those points is performed. During a compacted scan, only the points identified in the memory have the actual states of their data values accessed and stored for further analysis. The actual states of the identified subset of points are then available for further analysis. The actual states of the identified subset of points may be compared with expected states of that subset of points for further fault identification or further analysis.

The memory which stores the information for identifying a subset of points in the principal apparatus is typically loaded under control of the secondary computer. In this manner, the identification of any selected subjet of points in the principal apparatus is controlled by the secondary computer. Hence, great flexiblity and speed is available in the analysis of the principal apparatus.

In accordance with the above summary, the present invention achieves the objective of providing an improved system for fault detection and analysis particulrly in a data processing system having a large number of points for fault detection and analysis.

Additional objects and features of the invention will appear from the following description in which the preferred embodiments of the invention have been set forth in detail in conjunction with the drawings.

BRIEF DESCRIPTION OF THE DRAWINGS

FIG. 1 depicts a block diagram of an overall data processing system suitable for using the present invention.

FIG. 2 depicts a schematic representation of the console unit of the system of FIG. 1.

FIG. 3 depicts a schematic representation of the interface controller and the console/CPU interface processor (CCIP) which together form part of the console unit of FIG. 2.

FIG. 4 depicts a schematic representation of further details of the CCIP processor of FIG. 3.

FIGS. 5 and 6 together depict a schematic representation of the synchronous sequencer which forms part of the CCIP processor of FIG. 4.

FIG. 7 depicts further details of the checksum generation logic which forms a part of the checksum generator within the FIG. 4 CCIP processor.

FIG. 8 depicts a schematic representation of one circuit which serves as an example of points to be examined for fault detection within the instruction unit of the FIG. 1 system.

DETAILED DESCRIPTION

Overall System — FIG. 1

In FIG. 1, the data processing system of the present invention is shown with a principal apparatus including a main store 2, a storage control unit 4, an instruction unit 8, an execution unit 10, a channel unit 6 with associated input/output (I/O) and a console unit 12. The console unit 12, in addition to being part of the principal apparatus, also includes a console computer which forms part of the secondary apparatus where the secondary apparatus is independent of the principal apparatus. Of course, the location of and type of computer forming the secondary apparatus are not critical elements of the present system.

The system of FIG. 1, as a principal apparatus, operates under control of a primary system of instructions where an organized group of those instructions forms a primary system program. Primary system instructions and the data upon which the instructions operate are introduced from the I/O equipment via the channel unit 6, through the storage control unit 4, and into the main store 2. From the main store 2, system instructions and the data are fetched by the instruction unit 8, through the storage control unit 4 and are processed so as to control the execution within the execution unit 10. The principal apparatus of the FIG. 1 system can be, of course, any data processing system.

In any such data processing system, faults are bound to occur causing erroneous operation of the principal apparatus. It is the function of the secondary apparatus to detect such faults and to help identify the points within the principal apparatus causing the faults.

Console Unit — FIG. 2

In FIG. 2, the console unit 12 of FIG. 1 is shown in further detail. Console 12 is a secondary apparatus for performing fault detection and analysis for the principal apparatus. Console 12 includes a digital computer 501 which is interconnected with a console memory 502 in a conventional manner. The digital computer 501 is connected to a plurality of controllers including a disc controller 516, a channel controller 411, a panel controller 513 and an interface controller 511. Additional controllers may be connected to the computer 501 in a conventional manner.

The console computer 501 together with its controllers and memory form a programable secondary apparatus which operates independently from the principal apparatus. The independence is both with respect to processing in and the data and control paths of the principal apparatus.

The arrangement between the computer 501, the memory 502 and the controllers of FIG. 2 is conventional. The computer 501 is any well-known computer such as the computer identified in the above cross-referenced application DATA PROCESSING SYSTEM AND INFORMATION SCANOUT. Also, the controllers which connect to computer 501 are well-known devices. The disc controller 516 interfaces between the computer 501 and a disc file system 528 in a conventional manner. The controller 411 is one of the channel controllers associated with the channel unit 6 of FIG. 1. The panel controller 513 interfaces in a conventional manner between the digital computer 501 and the control panel 524.

The interface controller 511 interfaces between the console/CPU interface processor (CCIP) 525 and the digital computer 501. The interface controller 511 connects to the digital computer 501 over the 48-bit bus 535 and to the CCIP processor 525 by the bus 533. The processor 525 in turn is connected over bus 436 to many points, such as registers and control line latches, throughout the data processing system of FIG. 1.

The secondary apparatus of the present invention includes the console computer 501, the interface controller 511 and the CCIP processor 525. The secondary apparatus communicates with the primary apparatus of FIG. 1 so as to carry out fault detection, fault analysis and other tasks. Specifically, the secondary apparatus accesses points within the primary apparatus and causes an actual checksum to be generated in response to the data levels of the points accessed by the secondary apparatus. Thereafter, the secondary apparatus compares the actual checksum so obtained with the expected checksum resident in the secondary apparatus storage.

CCIP Processor and Interface Controller — FIG. 3

In FIG. 3, the console/CPU interface processor 525 and the interface controller 511 and their interconnections are shown in further detail. The function of processor 525 is in response to computer 501 to access data values of addressed points in the principal apparatus, form actual checksums on the accessed data values and provide the actual checksums to computer 501 for comparison with expected checksums. Transfers to and from computer 501 and processor 525 are through controller 511.

The interface controller 511 connects over the 48-bit bus 535 to the console computer 501 in a conventional manner. The bus 535 connects through conventional input and output selection gates 576 to the components of the controller 511. Specifically, a 16-bit bus connects to the output data register (ODR) 575. A 4-bit bus connects to the select address register (SAR) 574. A 3-bit bus connects to the E register (ER) 578. A 4-bit bus connects to the input mask register (IMR) 579. The LOAD line 549, the START line 550, and the CLEAR line 551 are individual output lines. The DONE line 585 and the 8-bit bus 588 are input lines to the gates 576. The in gate (IG) 572 provides a 16-bit input bus to the gates 576.

The function of the ODR register 575 is to cause addresses specifying particular points within the primary apparatus of FIG. 1 to be loaded from the secondary apparatus into the CCIP processor 525. Additionally, the ODR register 575 is employed to control the operating state of the CCIP processor 525.

The function of the SAR register 574 is to control which portion of the processor 525 is to receive data from the interface controller 511 or which portion is to return data to the interface controller 511.

The function of the IG gates 572 is to connect data from one set of 16-bit gates within the bank of gates 508 into the selection gates 576. The functions of the ER register 578, the AND gate 583 and the IMR register 579 are not employed directly in the present invention. The function and details of these elements are described in the above cross-referenced application entitled CONSOLE AND DATA PROCESSING SYSTEM.

In FIG. 3, the CCIP processor 525 connects to the interface controller 511 over the lines 533. In a similar manner, the CCIP processor 525 has input/output lines 436 which connect to the principal apparatus of FIG. 1 in a manner to be further explained hereinafter. Briefly, the 9-bit scan address bus 590 addresses one of 512 circuit points within each of 128 sections, called MCC's, within the principal apparatus of FIG. 1. The data value of each of the 128 addressed points is returned on the 128-bit scan data bus 591. The particular details of how the principal system of FIG. 1 is organized for addressing and accessing of information is described in the above cross-referenced application DATA PROCESSING SYSTEM AND INFORMATION SCANOUT and the applications cross-referenced therein.

In FIG. 3, the processor 525 includes a conventional 4-bit decoder (DEC) 597. Decoder 597 is loaded by the 4-bit bus 580 from the SAR register 574 in the interface controller 511. Decoder 597 functions in a conventional manner to select one of its outputs, up to 16, and thereby determines which portion or portions of the processor 525 are to be enabled for receiving information from or transmitting information to controller 511.

One portion of the processor 525 is the 16-bit scan address register (SADR) 556. Register 556 is loaded by the 16-bit bus 599 from the ODR register 575 of the controller 511. The loading of register 556 occurs under control of one of the decoded outputs, output 621-10 from the decoder 597 in combination with the LOAD signal on line 549. Those signals are combined in the AND gate 559 to control the loading into SADR register 556 in a conventional manner.

Another portion of the processor 525 is the 16-bit operating state register (OSR) 557. The OSR register 557 is loaded from the 16-bit bus 599 from the ODR register 575 of controller 511. Control of the loading is under the decoded output 621-8 from the decoder 597 in combination with the LOAD signal from line 549. Those control signals are combined in AND gate 558 to control the loading of OSR register 557. The output of the OSR register 557 connects as an input to control the sequencer 503.

Another portion of the processor 525 is the bit selector/store 506. Store 506 functions when selected by the AND gate 560 to select one of the input lines on the 128-bit bus 593 and to store internally that bit. The particular one of the 128 address bits selected corresponding to one out of 128 MCC's is determined by the 7-bit bus 590-1 from the SADR register 556. The data on bus 593 selected by selector/store 506 represents the data appearing on the 128-bit scan data bus 591 as modified, if at all, in the mask 505. The AND gate 560 which enables the bit selector/store 506 is satisfied by the LOAD signal from line 549 and the decoded output 621-7 from the decoder 597. The 16-bit output from selector/store 506 is input to one of the groups of selection gates 508.

The group of gates 508 includes a plurality of 16-bit gates 561 through 568 and 569-1 through 569-6. Each of the selection gates in the group 508 is enabled by a decoded output from the decoder 597. Only one of the 16-bit gates in the group of gates 508 is enabled at any one time. The enabled one of the gates provides the output to the 16-bit bus 589 which connects to the in gates (IG) 572 in the interface controller 511.

In FIG. 3, the relationship between the source of the information to be gated out (SOURCE), the 16-bit gate utilized (GATE NO.), and the decoded output from decoder 597 (DEC OUTPUT) is shown in the following TABLE I.

TABLE I

| SOURCE | GATE NO. | DEC OUTPUT |
|---|---|---|
| Bus 593: | | |
| SCAN 0–15 | 561 | 621-0 |
| SCAN 16–31 | 562 | 621-2 |
| SCAN 32–47 | 563 | 621-1 |
| SCAN 48–63 | 564 | 621-11 |
| SCAN 64–79 | 565 | 621-5 |
| SCAN 80–95 | 566 | 621-4 |

TABLE I-continued

| SOURCE | GATE NO. | DEC OUTPUT |
|---|---|---|
| SCAN 96-111 | 567 | 621-12 |
| SCAN 112-127 | 568 | 621-13 |
| Gated State BUS 592 | 569-1 | 621-8 |
| Checksum Generator 507 | 569-2 | 621-6 |
| Selector/Store 506 | 569-3 | 621-10 |
| SADR 556 | 569-4 | 621-5 |
| ODR 575 | 569-5 | 621-7 |
| PROC Gates 523 | 569-6 | 621-14 |

In FIG. 3, the processor 525 includes a console/CPU interface processor (CCIP) memory 504. The memory 504 is a conventional random access memory storing 512 128-bit words. The locations in the memory 504 correspond 1-to-1 with the points addressable and accessible within the principal apparatus of FIG. 1. Memory 504 is utilized to store either a masked (logical 1) or unmasked (logical 0) value to indicate the state of every one of the 65,536 points addressable in and accessible from the principal apparatus. The values accessed from the memory 504 are utilized to control which subset of points addressed and accessed is to be unselected (masked values) and which subset is to be selected (unmasked values). Memory 504 is addressed by the 16-bit output bus 590-2 from the SADR register 556. The high-order 9 bits specify one of 512 128-bit words. The low-order 7 bits specify bit positions within a 128-bit word. The contents of the addressed word in memory 504 appear on the 128-bit output bus 534. Any location within the 128-bit bus 534 having a logical 1 causes the corresponding bit from 128-bit bus 591 to be masked in the mask 505. If all bits on bus 534 are 0, then the information on bus 593 for mask 505 is identical to the inverted information on bus 591.

In FIG. 3, the synchronous sequencer (SS) 503 functions to control many of the other parts of the processor 525. The interconnection of the control signals on output bus 521 to the remainder of the parts of the processor 525 is described hereinafter. Briefly, the sequencer 503 receives the CLEAR, START and LOAD lines 551, 550 and 549 from the interface controller 511 and receives the decoded outputs 621-6, 621-7 and 621-10 from the decoder 597. Sequencer 503, in response to these input signals, functions to provide appropriate output signals on bus 521 to control processor 525 to carry out its fault detection and other functions. When the fault detection operation is being carried out, the sequencer 503 sequences 512 times, once for each of the 512 bits per MCC accessible from the principal apparatus in FIG. 1.

In FIG. 3, the checksum generator 507 receives the 128-bit bus 593 as its input. Checksum generator 507 functions to form a checksum each time information from a new set of points appears on bus 593. For the principal apparatus of FIG. 1, this occurs 512 different times for a full scan of all points. Therefore, in one check of the principal apparatus, 511 different intermediate checksums and one final checksum are generated. Each intermediate checksum has a value determined both by the information content on bus 593 and the value of the previous intermediate checksum. When all 512 iterations of the sequence have been completed, the final checksum appears on the 16-bit output bus connected to the 16-bit gate 569-2 which is within the group of gates 508.

CCIP Processor — FIG. 4

In FIG. 4, further details of the CCIP processor 525 of FIG. 3 are shown.

The SADR register includes the 7-bit scan address stage 556-1 and the 9-bit scan address stage 556-2. Stages 556-1 and 556-2 are loaded with the low-order 7-bits and the high-order 9 bits, respectively, of the 16-bit bus 599. Both of the stages 556-1 and 556-2 are loaded under command of a signal on their load (L) inputs from the gate 559. Stage 556-1 is incremented by a signal on its I input via line 661 from sequencer 503 and stage 556-2 is incremented by a signal on its I input via line 662 from sequencer 503. Stages 556-1 and 556-2 are cleared by signals on their CLR input via lines 666 and 667, from sequencer 503. A carry in on the CI input occurs to the stage 556-1 via the line 667 from the sequencer 503. Carry outs on outputs CO appear from stages 556-1 and 556-2 on lines 663 and 664. The carry out lines 663 and 664 are input to the sequencer 503. The parallel data outputs from the stages 556-1 and 556-2 are the 7-bit bus 590-1 and the 9-bit bus 590 which together form the 16-bit bus 590-2. The 7-bit bus 590-1 defines any one of th 128 different MCC's which are utilized in the principal apparatus of FIG. 1. The 7-bit bus 590-1 is utilized to address to the multiplexer 668 within the bit selector/store 506. The multiplexer 668 is a conventional selection device for receiving the 128-bit input bus 593 and selecting a single one of those inputs as an output on the 1-bit line 669. The line 669 forms the data input (DI) to a 16-bit shift register 670. The data presented on the 1-bit line 669 is shifted through shift register 670 under command from the shift(S) line 671 from the sequencer 503. Also, the information on the 16-bit bus 590 is loaded into the shift register 670 under command of the load signal (L) from AND gate 560. A serial output (DO) from shift register 670 appears on line 672 which in turn forms the data input (DI) to the memory 504. The 16-bit parallel output from the shift register 670 connects to the output gates 508 for gating out when selected by decoder 597 on the 16-bit output bus 589.

In FIG. 4, the checksum generator 507 includes a checksum register (CSR) 673 and checksum logic 674-1 and 674-2. The CSR register 673 receives a 16-bit parallel input on the bus 675 from the logic 674-1 and 674-2. Register 673 in turn provides a 16-bit output on the bus 595 which connects both to the out gates 508 and the logic 674-1 and 674-2. The CSR register 673 is loaded with the contents of bus 675 under control of the load line 676 from the sequencer 503. Register 673 is cleared to an all 0 state with a signal on the clear line 677 from the sequencer 503.

In FIG. 4, the mask 505 includes the 128-bit gates 539 and 547. The gate 539 typically is formed from 128 2-input NOR gates where one of the inputs for each NOR gate is a different one of the lines from the 128-bit bus 591 and the other input, common to all gates, is a control line 678 from the sequencer 503. Whenever line 678 is a logical 1, the gates 539 are all forced to produce a 0 output to the 128-bit gate 538. Whenever line 678 is a 0, the 128-bit output from gate 539 has the inverted levels of the 128-bit bus 591. Gate 539, therefore, serves to pass or inhibit the data on bus 591.

The 128-bit gate 547 receives the 128-bit bus 534 from memory 504. Gate 547 typically is formed from 128 2-input gates. One input for each gate is a different one of the bits from the 128-bit bus 534 and the other input, common to all gates, is the control line 679 from the sequencer 503. Whenever control line 679 is a logical 0, the data values on bus 534 appear as an output from gate 547. Whenever the logic level of line 679 is 1, the data values from gate 547 are all 0's. The 128-bit OR gate 538 logically OR's the data from gates 547 and 539 onto memory/scan bus 593. The logically true level for data on the bus 593 is 0. The effect therefore of any 1 in a bit location of the bus 534 coincident with the control line 679 being logical 0, is to force a 1 to the corresponding location on the bus 593, that is, to a logically not true level. This forcing of 1 bits has the effect of masking the particular bits forced. Any bit of the data on bus 593 is selectable by the multiplexer 668. Also, bus 593 is input to the checksum logic 674 and is selectable in groupss of 16 bits through the groups of gates 508.

The CCIP memory 504 receives data a bit at a time on the 1-bit line 672 from the shift register 670. Data appearing on line 672 is written into the memory 504 with a write command (W) appearing on the line 679 from the sequancer 503. The location at which data is written into the memory 504 is controlled by the 16-bit address lines from the address buses 590-1 and 590.

In FIG. 4, further details of the control circuitry 509 are shown. This control circuitry, however, is not directly employed in the present invention. Its operation in connection with the CCIP processor 525 is the same as that described in the above cross-referenced application CONSOLE AND DATA PROCESSING SYSTEM and hence requires no further description in connection with the present invention except to note that the output (AS7) of gate 582 is enabled by the line 680 from the sequencer 503.

Synchronous Sequencer — FIGS. 5 and 6

In FIG. 5 and FIG. 6, further details of the sequencer 503 of FIG. 4 are shown. The sequencer 503, in the present embodiment, controls the CCIP processor 525 of FIGS. 3 and 4 in performing any selected one of three operations. The three operations are WRITE MEMORY (TABLE V hereinafter), CHECKSUM (TABLE VI hereinafter) and COMPACTED SCAN (TABLE VII hereinafter).

In FIG. 5, the input line 621-6 from decoder 597 of FIG. 4 is utilized to set the sequencer 503 for a checksum operation. The line 621-6 connects to AND gate 685-1 which is enabled by the START line 550 from interface controller 511 of FIG. 3. When satisfied, gate 685-1 sets the set/reset latch 686-1. The output from latch 686-1 connects to the points throughout FIG. 5 and FIG. 6 designated as A. A signal to the A points signifies that the sequencer 503 is set for a checksum operation.

In FIG. 5, the input line 621-7 from the decoder 597 of FIG. 4 functions through AND gate 685-2 to set latch 686-2 and therefore sequencer 503 for a write memory operation. Gate 685-2 is enabled by the LOAD line 549 from interface controller 511 of FIG. 3. The output from latch 686-2 is connected to the B points throughout the apparatus of FIG. 5 and FIG. 6. A signal to the B points signifies that the sequencer 503 is set for a write memory operation.

In FIG. 5, the input line 621-10 from the decoder 597 of FIG. 4 sets the sequencer 503 for a compacted scan operation through AND gates 685-3. Gate 685-3 is enabled by the START line 550 from interface controller 511 of FIG. 3 and operates to set the latch 686-3. The output from latch 686-3 connects to all of the C points throughout the FIG. 5 and FIG. 6 apparatus. A signal to the C points signifies that sequencer 503 is set for a compacted scan operation.

Whenever any one of the gates 685-1, 685-2 or 685-3 is satisfied to signal one operation, two of the OR gates 648-1, 648-2 or 648-3 are operative to reset two of the latches 686-1, 686-2 and 686-3, to insure that the other two operations are not signaled at that time. Also, when any of the gates 685-1 through 685-3 is satisfied, OR gate 648-4 generates a RESET signal which is propogated throughout the circuit of FIGS. 5 and 6 to set or reset the latches and register stages therein.

In FIG. 5, the mode states of the checksum, write memory and compacted scan operations are determined by the flip-flop stages 687-1 through 687-6. Stage 687-1 designates an IDLE state; stage 687-2 designates a GO state; stage 687-3 designates an initiate (INIT) state; stage 687-4 designates a scanout procedure (SOP) state; stage 687-5 indicates a not scanout procedure (NSOP) state; stage 687-6 indicates an END state.

After the system of FIGS. 5 and 6 has been reset, the IDLE stage 687-1 and the GO stage 687-2 are set to provide 1's on their outputs. Provided that the END stage 687-6 has been properly reset with a 0 on its output, the GO stage 687-2 remains set and enables the INIT stage 687-3 to be set to provide a 1 on its output.

The output from the INIT stage 687-3 enables the AND gates 620-1 and 620-2 to provide the CLR CSR signal on line 677 and the CLR SADR signals on lines 666 and 667 if a checksum operation is to be carried out as indicated by the A output from the latch 686-1. The INIT stage 687-3 also resets the output latch 695. The output from latch 695 is the AS7 line 680 which designates when the operation being controlled by sequencer 503 is complete. The INIT stage 687-3 also enables the gate 689-1 which allows the SOP stage 687-4 to be set to initiate a scanout procedure. The output from the INIT stage 687-3 also enables the gate 689-2 which permits the NSOP stage 687-5 to be set whenever no scanout procedure is to be carried out. The SOP stage 687-4, when enabled, is set for either the checksum operation designated by latch 686-1 (the A output) or by the compacted scan output designated by latch 686-3 (the C output) through OR gate 649. The NSOP stage 687-5 when enabled is set by operation of the write memory latch 686-2 (the B output). The SOP stage 687-4 if previously set, the NSOP stage 687-5 if previously set and the END stage 687-6 are all caused to switch states by operation of an END signal from FIG. 6. The END signal from FIG. 6 indicates that the operation (that is checksum, write memory, or compacted scan) has ended thus clearing to reset the SOP stage 687-4 and the NSOP stage 687-5 while the END stage 687-6 is set with a 1 on its output. That 1 sets the output latch 695 to provide the AS7 signal on line 680 and resets the GO stage 687-2. The reset of the GO stage 687-2 causes the IDLE stage 687-1 to be set. The RESET, INIT, SOP and the NSOP signals associated with the mode state stages 687 are connected as inputs to the apparatus of FIG. 6.

In FIG. 6, the apparatus for controlling the time state of The CCIP processor 525 of FIGS. 3 and 4 is shown. The FIG. 6 apparatus receives the INIT, SOP, NSOP mode state signals and the A, B and C operation signals from the FIG. 5 apparatus. Additionally, the FIG. 6 apparatus receives the RESET signal from and returns the END signal to the FIG. 5 apparatus.

In FIG. 6, the time state of the sequencer is determined by the time-state shift-register 696 which includes the shift-register stages 696-0 through 696-5. The shift-register 696 is initiated by loading a 1 into the stage 696-0 through operation of the INIT signal from FIG. 5. The INIT signal also satisfies AND gate 607 if a compacted scan operation (C) is being performed. Gate 607, through OR gate 605, sets latch 633 to provide a DISABLE SCAN signal on line 678. The 1 loaded into stage 696-0 enables an AND input to latch 610 and is transferred to the stage 696-1. If during a compacted scan operation (C), a logical 0 is read out of the CCIP memory 504 of FIG. 4, at the address selected by multiplexer 668, and appears on line 669, that 0 prevents latch 610 in FIG. 6 from being set. If a logical 1 appears on line 669 under the same conditions, latch 610 is set so that delay stage 696-6 is by-passed. The output from stage 696-1 is loaded into stage 696-2. Additionally, the output from stage 696-1 causes a load (LD) signal to an 8-bit delay counter 697. The load signal from stage 696-1 causes the BITS (0–7) of bus 616 from the OSR register 557 of FIG. 4 to be loaded through the data input (DI) into counter 697. The count in counter 697 is used to determine the length of the delay caused by the stage 696-6 provided that stage is not by-passed.

The output from stage 696-2 is one AND'ED input to delay stage 696-6. The other AND'ED input is derived from the gate 649. In the absence of a compacted scan operation, the output from latch 610 is a 0 which enables gate 649. Also, during a compacted scan operation, the output from gate 610 only remains a 0 if the mask bit accessed from memory 504 of FIG. 4 is not a 1 as it appears on line 669. Gate 649, therefore, produces a logical 1 output whenever the mode state is SOP and, during a compacted scan operation, the scanning has not detected a logical 0 from an addressed data point in the CCIP memory 504. A 1 from gate 649 is AND'ED with the output from stage 696-2 to set the delay stage 696-6. With the stage 696-6 set, its output enables, on the DEC input, the delay counter 697 to be decremented. When enabled, counter 697 is decremented until it produces a logical 1 output which indicates that the counter has been decremented to 0.

The logical 1 output from counter 697 is AND'ED with the output from stage 696-6 to again provide an input to stage 696-6 which functions to switch the output from stage 696-6 from 1 to 0. The 0 output from stage 696-6 is AND'ED with the output from gate 649 to switch stage 696-3 to provide a logical 1 on its output. Note that stage 696-3 is also set directly by the AND'ED combination of a NSOP mode state or a 1 from latch 610 through OR gate 650 and the direct output of stage 696-2. Accordingly, when no scanout procedure is to be performed (NSOP) or during a compacted scan when the data accessed from memory 504 is a 1, the delay of stage 696-6 is by-passed. Also, when the data accessed from memory 504 is a 0 during a compacted scan (610 output is 0), gate 609 is enabled to permit counter 698 to be incremented when the output from stage 690-4 occurs. Stage 696-3 enables the gates 647-1 through 647-4 and sets the latch 633. Latch 633 is reset whenever a new count is loaded into delay counter 697 by the output from stage 696-1. Latch 633 in turn enables gates 632-1 and 632-2 which in turn through gates 630 and 629-1 and 629-2 generate the disable memory signal on line 679 and the disable scan signal on line 678 depending on whether or not a checksum operation is being performed.

Similarly, the gates 647-1 through 647-4 control the generation of the write memory signal on line 679, the shift-register signal on line 671 and the load CSR register signal on line 676. The output from stage 696-4 is AND'ED with the output from OR gate 618 in AND gate 635. If the output from gate 618 is a 1, gate 635 provides the END signal indicating that the end of an operation has occurred. If the output from gate 618 is a 0, that 0 is inverted and AND'ED with the output from stage 696-4 to set stage 696-5. Stage 696-5 then provides an input back to the first stage 696-0 and the stages of the time-state register 696 are again sequenced in the manner previously described.

The 1 or 0 output from the OR gate 618 determines whether or not the end of an operation has occurred. During a compacted scan or a write memory operation, gates 699-1 or 699-2 are enabled and the duration of the operation is controlled by the 4-bit counter 698 which counts a total of 16 counts. After 16 counts, gates 699-1 or 699-2 are enabled to provide a 1 output from OR gate 618 to provide the END signal.

During a checksum operation, AND gate 699-3 becomes enabled when a carry out CO on line 664 from the 9-bit SADR stage 556-2 (BITS 0–8) has occurred. The output from the SADR stage 556-2 indicates that a total of 512 repetitions of the time-state register 696 has occurred, thereby indicating that the END signal should be generated.

Checksum Generator — FIG. 7

In FIG. 7, the checksum generator 507 of FIG. 4 is shown in further detail. The checksum generator 507 is formed by the reduction logic 674-1, the checksum logic 674-2 and the checksum register (CSR) 673. The function of the checksum generator 507 is to generate an actual checksum on output bus 595 having a value dependent upon the actual states of principal circuit points as those actual states are represented on input bus 593. Generator 507 also generates the actual checksum having a value dependent upon the contents of checksum register 673 where the contents are usually a previously formed intermediate checksum.

The checksum register 673 is typically a shift register which includes the 16 stages 673-0, 673-1, ..., 673-15. The outputs of the stages 673-0, 673-1, ..., 673-15 connect as inputs to the EXCLUSIVE-OR gates 684-0, 684-1, ..., 684-15, respectively. Gates 684 are included within the checksum logic 674-2. Those outputs from stages 673 also form the 16-bit bus 595 which, as shown in FIG. 4, connects to the out gates 508 for returning an actual checksum to the secondary apparatus computer 501 of FIG. 2.

In FIG. 7, the inputs to the stages 673-1, 673-2, ..., 673-15, 673-0 are provided by the outputs from the EXCLUSIVE-OR gates 684-0, 684-1, ..., 684-14, 684-15, respectively. The shift register stages 673-0 through 673-15 are loaded with the outputs from the EXCLUSIVE-OR gates 684 by a signal on the LOAD CSR line 676. Similarly, those stages 673 are cleared by a signal on the CLEAR CSR line 677. The control lines 676 and 677 are derived from the sequencer 503 of FIG. 4.

In FIG. 7, the reduction logic 674-1 is an EXCLUSIVE-OR gate tree circuit formed by three levels of EXCLUSIVE-OR gates 681, 682, and 683. The reduction logic is a binary tree circuit in that the bus 593 has $2^Y$ inputs (for example, 128 where Y equals 7) and the bus 786 has $2^X$ outputs (for example, 16 where X equals 4). The first level includes the 8-way EXCLUSIVE-OR gates 681-0, 681-1, . . . , 681-7. Each of those 8-way gates 681 is comprised of eight 2-input EXCLUSIVE-OR gates (not explicitly shown). Each of the 2-input EXCLUSIVE-OR gates receives a different one of the input lines 0 through 7 and a different one of the input lines 8 through 15. Each of the 2-input EXCLUSIVE-OR gates provides one output so that there are eight outputs from the gate 681-0 and similarly eight outputs from each of the other gates 681.

In FIG. 7, the second level includes the four 8-way EXCLUSIVE-OR gates 682-0, 682-1, 682-2 and 682-3. The gate 682-0 receives eight pairs of inputs, with one input for each pair from the gate 681-0 and the other input for each pair from gate 681-4. Gate 682-0 provides, therefore, eight EXCLUSIVE-OR outputs. In a similar manner, the gate 682-1 combines signals from the gates 681-1 and 681-5 to provide eight EXCLUSIVE-OR outputs. The gate 682-2 combines outputs from the gates 681-6 and 681-2 to provide eight EXCLUSIVE-OR outputs. Finally, the gate 682-3 combines outputs from the gates 681-3 and 681-7 to provide eight EXCLUSIVE-OR outputs.

The third level comprises the 4-way EXCLUSIVE-OR gates 683-0, 683-1, 683-2 and 683-3. The gates 683 each comprises four 2-input EXCLUSIVE-OR gates. Gate 683-0 forms the EXCLUSIVE-OR of four pairs of the outputs from gate 682-0 to provide four EXCLUSIVE-OR outputs. Similarly, the gates 683-1, 683-2 and 683-3 combine the outputs of the gates 682-1, 682-2 and 682-3, respectively.

The 16 outputs from the gates 683-0 through 683-3 are each connected to a different input to 2-input EXCLUSIVE-OR gates 684-0, 684-1, . . . , 684-15. The checksum logic 674-2, in addition to gates 684, includes circuit means, including an inverter 785, for transforming the newly formed actual checksum before storage in the checksum register. The inverter 785 inverts the output of the last stage and provides an input to the first stage. While a simple one stage shift and last stage to first inversion is employed in the present embodiment, other forms of cyclic redundancy may be utilized. For example, connections from the inverter 785 can be made to any of the inputs for the stages 673-1 through 673-14.

The operation of the FIG. 7 checksum generator is to load successively in 512 cycles the CSR register 673 with a new actual checksum, that is, a new actual checksum for each 128-bit group of points on bus 593 from the principal apparatus. The new actual checksum is the transformed EXCLUSIVE-OR combination of the present checksum stored in the CSR register 673 and the reduced output on bus 786.

In operation, to check all 65,536 points in the principal apparatus, 512 successive 128-bit groups are each scanned (addressed and accessed) to provide 128-bit inputs to the reduction logic 674-1. Each of the 128 bits is gated into the checksum logic 674 over bus 593 to form a 16-bit reduced representation on bus 786. Prior to the first one of the 512 successive 128-bit groups, the CSR register 673 is cleared to all 0's by operation of the CLEAR CSR signal on the line 677. Thereafter, the first 128-bit input on bus 593 is processed in logic 674-1 and logic 674-2 to form a first intermediate checksum which, after transformation (inversion of last stage), is loaded into the register 673 by operation of the LOAD CSR signal on line 676 to become the present checksum.

When the second 128-bit input appears on bus 593, it is combined with the first intermediate checksum stored in the register 673 to form a second intermediate checksum which is again stored in register 673 by operation of a signal on line 676. For each succeeding 128-bit input on bus 593, the checksum register 673 is again loaded with a new actual checksum. Checksum register 673 is loaded a total of 512 times forming 511 intermediate checksums and a 512th final actual checksum. The final actual checksum is, of course, logically dependent on all of the prior intermediate actual checksums. In this manner, the 65,536 points within the principal apparatus are logically compressed into a 16-bit actual checksum which appears on bus 595.

The actual checksum on bus 595 is transferred from the CSR register 673 through the out gates 508 of FIGS. 3 and 4 to the interface controller 511 and to the console computer 501 of FIG. 2. The computer 501 then compares the actual checksum with an expected checksum obtained from memory 502. If the actual and expected checksums are not the same, a fault condition in the principal apparatus has been detected.

Principal Apparatus Example — FIG. 8

In FIG. 8, a particular example of points within the principal apparatus of FIG. 1 are shown. These points are to be addressed and accessed in connection with the formation of a checksum for fault detection or in connection with a compacted scan for fault analysis.

In FIG. 8, an instruction buffer register 330 is shown. Register 330 includes two stages, a low stage 330-1 and a high stage 330-2 where each stage has 16 data bits and two parity bits for a total of 18 bits per stage. The data bits for one stage include IB0, IB1, . . ., IB7 and the parity bit IBP(0–7), and the data bits IB8, IB9, . . ., IB15 and the parity bit IBP(0–15). Data is latched into the stages 330-1 or 330-2 of register 330 from one of four 18-bit buses. The 18-bit buses 690, 691, 692 and 693 have control gates (not explicitly shown in FIG. 8) enabled by control signals for controlling the gating.

Four control signals, NSI0, NSI1, NSI2 and NSI3, control the output gates (not shown) associated with the IB register 330 and other registers (not shown). In one particular implementation of gates (not shown), each of the control signals NSI0, NSI1 and NSI2 is duplicated to form, in each case, three identical copies for a total of nine control signals. The tenth control signal NSI3 is not duplicated. The duplication of identical signals within logic circuits for gating control is well-known and is generally employed to satisfy the fan-in, fan-out, or other signal requirements of the particular type of logic circuitry employed.

In the FIG. 8 circuit, the ten control signals for controlling the gates for IB register 330 and other registers are derived from a sequencer 325. The ten control signals (namely, NSI0 [Copies 1, 2, 3], NSI1 [Copies 1, 2,3], NSI2 [Copies 1,2,3], and NSI3) appear on the 10-bit bus 694 from a sequencer 325.

In one particular example, the IB register 330 in FIG. 8 of the present application is the next instruction buffer which appears within the instruction unit 8 of the principal data processing system of FIG. 1. The function of the IB register 330 is described in more detail in U.S. Pat. No. 3,840,861 entitled DATA PROCESSING SYSTEM HAVING AN INSTRUCTION PIPELINE FOR CONCURRENTLY PROCESSING A PLURALITY OF INSTRUCTIONS, invented by Gene M. Amdahl, et al and issued Oct. 8, 1974. The IB register 330 and the sequencer 325 are described in connection with FIG. 3 of that patent. Briefly, the instruction unit 8 operates in a conventional manner in sequential synchronous cycles of the principal apparatus. A cycle counter (not shown) can be employed to identify uniquely particular cycles of the principal apparatus. During one cycle, for example, the register 330 and gate control signals have one set of values. During a subsequent cycle, another different set of values will appear. Each different set of values leads to the formation of a different checksum.

In a typical implementation of the logic for the sequencer 325 and the register 330, large-scale integrated circuits are employed. Such circuits are, for example, located on MCC's of the type described in connection with the above cross-referenced application DATA PROCESSING SYSTEM AND INFORMATION SCAN OUT. The IB register 330 is typically located on one MCC 601-1. Such an MCC includes a log chip 611-1 which has connections to each of the data points comprising the bits IB0 through IB7, IBP(Q-7), IB8, IB9, . . ., IB15, IBP(8-15) in the high stage 330-2. The points comprising the bits in the IB register stage 330-2 are only 18 of the 512 different points which can be contained on the MCC 601-1. For example, 18 points from low stage 330-1 form another set of the points on MCC 601-1. All of 512 addressable points contained on MCC 601-1 are addressed one at a time by the 9-bit scan address from bus 590. Bus 590 is input to the log chip 611-1. The output from the log chip 611-1 appears on the 1-bit line which is collected together as one of the 128 bits on the scan data bus 591.

In FIG. 8, the sequencer 325 and its ten output control lines appear on another MCC 601-2. The MCC 601-2 similarly includes a log chip 611-2 also addressable by the scan address bus 590 to select, one at a time, any one of 512 points on the chip 601-2. The ten control points NSI0 [Copies 1,2,3], NSI1 [Copies 1,2,3], NSI2, [Copies 1,2,3], NSI3 are each selectable by the log chip 611-2 in the manner described in the above cross-referenced application DATA PROCESSING SYSTEM AND INFORMATION SCANOUT.

In connection with the circuit of FIG. 8, the ten control lines of bus 694 from sequencer 325 and the 18 data bits from the IB register 330 are addressed and accessed employing the console computer program appearing as TABLE I in the above cross-referenced application DATA PROCESSING SYSTEM INFORMATION AND SCANOUT. The actual addresses in octal code employed in connection with the cross-referenced TABLE I appear in the following TABLE II of this application. The apparatus in the cross-referenced application, however, described an embodiment in which the principal apparatus employed up to 64 MCC's while the embodiment of the present application describes a principal apparatus which employs up to 128 MCC's. The following TABLE II shows the correspondence between addresses (in octal code) for a 64 MCC system and a 128 MCC system. With respect to the addressable points of FIG. 8, the following TABLE III shows the relationship between octal, binary, and hexadecimal addresses utilizing, as an example, three of the TABLE II addresses.

TABLE II

ADDRESSES OF FIG. 8 POINTS

| Name | 64 MCC's 16-Bit Address (Octal) | 128 MCC's 17-Bit Address (Octal) |
|---|---|---|
| NSI 0 [copy 1] | 057060 | 214071 |
| NSI 0 [copy 2] | 057064 | 215071 |
| NSI 0 [copy 3] | 057064 | 214271 |
| NSI 1 [copy 1] | 057074 | 217071 |
| NSI 1 [copy 2] | 057062 | 214471 |
| NSI 1 [copy 3] | 057072 | 216471 |
| NSI 2 [copy 1] | 057070 | 216071 |
| NSI 2 [copy 2] | 057063 | 214671 |
| NSI 2 [copy 3] | 057066 | 215471 |
| NSI 3 | 057071 | 216271 |
| IB 0 | 054001 | 000261 |
| IB 1 | 054012 | 002461 |
| IB 2 | 054100 | 020061 |
| IB 3 | 054101 | 020261 |
| IB 4 | 054112 | 022461 |
| IB 5 | 054200 | 040061 |
| IB 6 | 054201 | 040261 |
| IB 7 | 054212 | 042461 |
| IBP (0-7) | 054000 | 000061 |
| IB 8 | 054301 | 060261 |
| IB 9 | 054312 | 062461 |
| IB 10 | 054400 | 100061 |
| IB 11 | 054401 | 100261 |
| IB 12 | 054412 | 102461 |
| IB 13 | 054500 | 120061 |
| IB 14 | 054501 | 120261 |
| IB 15 | 054512 | 122461 |
| IBP (8-15) | 054300 | 060061 |

TABLE III

OCTAL/BINARY ADDRESSING

| TABLE II ENTRY | OCTAL ADDRESS | DATA VALUE CCIP MEM | | BINARY ADDRESSES | | HEX ADDRESSES |
|---|---|---|---|---|---|---|
| | | | | MCC BIT | MCC NO | MCC BIT |
| IBP (0-7) | 000061 | 0 | 0 | 0 000 000 00 | 0 110 001 | 0 00 |
| IB0 | 000261 | | 0 | 0 000 000 01 | 0 110 001 | 0 01 |
| | 000461 | 3 | 1 | 0 000 000 10 | 0 110 001 | 0 02 |
| | 000661 | | 1 | 0 000 000 11 | 0 110 001 | 0 03 |
| | 001061 | | 1 | 0 000 001 00 | 0 110 001 | 0 04 |
| | 001261 | 7 | 1 | 0 000 001 01 | 0 110 001 | 0 05 |
| | 001461 | | 1 | 0 000 001 10 | 0 110 001 | 0 06 |
| | 001661 | | 1 | 0 000 001 11 | 0 110 001 | 0 07 |
| | 002061 | 7 | 1 | 0 000 010 00 | 0 110 001 | 0 08 |
| | 002261 | | 1 | 0 000 010 01 | 0 110 001 | 0 09 |
| IB1 | 002461 | | 0 | 0 000 010 10 | 0 110 001 | 0 0A |
| | 002661 | 3 | 1 | 0 000 010 11 | 0 110 001 | 0 0B |
| | 003061 | | 1 | 0 000 011 00 | 0 110 001 | 0 0C |
| | 003261 | | 1 | 0 000 011 01 | 0 110 001 | 0 0D |
| | 003461 | 7 | 1 | 0 000 011 10 | 0 110 001 | 0 0E |
| | 003661 | | 1 | 0 000 011 11 | 0 110 001 | 0 0F |

In TABLE III, the 16 octal and binary addresses starting with octal address 000061 and running to octal address 003661 are shown. In TABLE II, address 000061 corresponds to the address of the parity bit IBP (0-7). Since, for convenience, the CCIP memory 504 in FIGS. 3 and 4 is addressed 16 bits at a time to write data, it is necessary to consider 16 bits of data at a time. Therefore, when it is desired that the CCIP memory data value corresponding to the IBP (0-7) be written as a 0, then all of the 16 addresses 000061 through 003661 as shown in TABLE III also have some data value written.

The principal apparatus of FIG. 1 also happens to have, between the addresses 000061 through 003661, two other addresses of interest from TABLE II. Those two other addresses correspond to the IB0 and IB1 bits of the IB register 330-2 of FIG. 8 and have octal addresses 000261 and 002461, respectively. The other addresses in TABLE III, that is, 000461 through 002261 and 002661 through 003661 are not employed in TABLE II. Those other addresses are available for use with other points (not described) on the MCC of TABLE III. Since only three of the addresses of TABLE III are of interest in connection with the particular example of FIG. 8 and TABLE II, only three 0's are written for data values into the CCIP memory in connection with the 16 addresses of TABLE III. Those three octal addresses receiving a 0 are 000061, 000261 and 002461. As indicated in TABLE III, the 1/0 bit pattern (right-hand side of DATA VALUE CCIP MEM column) for the 16 bits of TABLE III can be converted to an octal representation (left-hand side of column). For example, the three 1's in the right-hand side of the data value column for the three addresses 003261, 003461 and 003661 are converted in the left-hand column to an octal 7. Similarly, the other addresses have their data values converted so that the octal representation of the data in the CCIP memory for the TABLE II entries in the 16 addresses of TABLE III becomes 037737.

In a manner similar to TABLE III, each of the other addresses within TABLE II must be correlated to some 16-bit word within the CCIP memory.

In TABLE II, the addresses for IB2, IB3 and IB4 fall within the 16-bit octal address range 020061 through 023661. The IB5, IB6 and IB7 bits fall within the octal addresses between 040061 and 043661. The IB8, IB9, IBP(8-15) bits fall between the octal addresses 060061 and 063661. The IB10, IB11, IB12 bits fall between the octal addresses 100061 and 103661. The IB13, IB14, and IB15 bits fall between the octal addresses 120061 and 123661. Finally, the 10 control bits of TABLE II fall between the octal addresses 214071 and 217671.

The 1 and 0 CCIP memory data values required in order to enable only the addresses of TABLE II are derived in the manner indicated for the CCIP memory data values of TABLE III. Those data values in octal code for all of the TABLE II addresses are set forth in the following TABLE IV.

TABLE IV

| SADR START ADDRESS (Octal) | DATA FOR TABLE V DATA VALUE CCIP MEM (Octal) | Function |
|---|---|---|
| 014071 | 002417 | Enables the 10 bits corresponding to the ten NSI control lines |
| 000061 | 037737 | Enables IBP (0-7) ,IB 0,1 |
| 020061 | 037737 | Enables IB 2,3,4 |
| 040061 | 037737 | Enables IB 5,6,7 |
| 060061 | 037737 | Enables IBP (8-15) 8,9 |
| 100061 | 037737 | Enables IB 10,11,12 |
| 120061 | 037737 | Enables IB 13,14,15 |

Loading CCIP Memory For Subject Identification

As an example of the present invention, the generation of a checksum is described for the subset consisting of only of the 28 points of FIG. 8. Those 28 points of FIG. 8, of course, are only a small subset of the 65,536 points within the principal apparatus of FIG. 1. Any other subset of points from the principal apparatus may be selected. Subsets are selected by storing identification values (1's or 0's) in memory 504 as either masked (1) or unmasked (0) values.

Initially, the subset of unmasked points on which a checksum is to be generated must first be written into the CCIP memory 504. The points of interest are those indicated in FIG. 8 and which include the 18 bits of IB register stage 330-2 and the 10 NSI control bits associated therewith. The scanout addresses of each of those points of FIG. 8 are indicated in TABLE II. The data points of FIG. 8 (and TABLE II) relate to seven 16-bit words in the CCIP memory 504. The data values required to write 1's and 0's into the appropriate locations of those seven 16-bit words are listed in TABLE IV in octal code. All other 16-bit words in the CCIP memory 504 are written to contain all 1's. The 65,536 locations in the memory 504 comprise 4,096 16-bit words. Seven of those words are written as indicated in TABLE IV and the remaining 4,089 words are written with all 1's. In this manner, the 28 points of the subset become identified.

In order to write subset identification values into CCIP memory 504, the following TABLE V program of instructions is executed by the console computer 501 of FIG. 2.

TABLE V

| | WRITE MEMORY | |
|---|---|---|
| S1 WRMEM: | STA | 3,RET |
| S2 | DOB | 0,CCI1 |
| S3 | LDA | 0,SADRA |
| S4 | DOAP | 0,CCI1 |
| S5 | LDA | 0,OSRA |
| S6 | DOA | 0,CCI1 |
| S7 | LDA | 0,OSRV |
| S8 | DOBP | 0,CCI1 |
| S9 | LDA | 0,WMA |
| S10 | DOA | 0,CCI1 |
| S11 | DOBP | 1,CCI1 |
| S12 WTAS7: | DIA | 0,CCI2 |
| S13 | MOVS | 0,0 |
| S14 | MOVZR | 0,0SNC |
| S15 | JMP | WTAS7 |
| S16 | JMP | AT RET |
| S17 RET : | 0 | |
| S18 SADRA: | 120000 | |
| S19 OSRA: | 100000 | |
| S20 OSRV: | 000004 | |
| S21 WMA: | 70000 | |

Prior to entering the program of TABLE V, accumulator 0 (not shown) of console computer 501 is loaded with the complement of the 16-bit address of the first bit location in the CCIP memory 504 in which information is to be written. Similarly, accumulator 1 (not shown) is loaded with the complement of the 16-bit data pattern to be written in the CCIP memory starting at the location specified by accumulator 0. The TABLE V program of instruction causes the sequencer 503 to control the CCIP processor 525 in such a way as to write each 16 bit word of data into the memory 504 one bit at a time from the shift SR register 670. The TABLE V program is executed 4,089 times to load all 1's and seven times to load the information of TABLE IV.

In statement S1, a return address in accumulator 3 is stored in the address "RET" at S17.

In statements S2, S3, and S4 the SADR register 556 is initialized with the complement of the value specified in accumulator 0.

In statements S5, S6, S7, and S8 the OSR register 557 is initialized with the value 0 000004 (octal).

In statement S9, accumulator 0 is loaded from the location WMA at S21 with the value 70000 (octal).

In statement S10, the contents of the accumulator 0 are transmitted to the interface controller 511 and latched in the SAR register 574. Decoder 597 decodes the octal code 70000 to enable, via line 612-7, the sequencer 503 and gate 560 for the shift register 670.

In statement S11, the contents of accumulator 1 are transmitted to the interface controller 511 and latched in the ODR register 575. Also in S11, a LOAD signal is generated on line 549. The LOAD signal on line 549 together with the enable signal on line 621-7 satisfy gate 560 causing the SR register 670 to be parallel loaded with the complement of the value in the ODR register 575.

The LOAD signal on line 549 together with the enabling signal on decoder line 621-7 cause the sequencer 503 to execute a write memory sequence. During this write memory sequence, the data from the SR register 670 is written, one bit at a time, into 16 successive locations within the CCIP memory 504. The 16 successive locations written into are the locations commencing with the address in the SADR register 556 at the start of the operation and by the 15 succeeding states of the SADR register 556 as it is incremented one count at a time. During the operation, the carry in (CI) line 667 to SADR stage 556-1 is derived from the carry out (CO) line 664 from SADR stage 556-2. Upon completion of the operation the SADR 556 is incremented again to cause it to address the location subsequent to the last location written into and AS7 line 680 is energized to signal completion of the sequence.

In statements S12 through S15, the TABLE V program of instructions wait until AS7 line 680 has been energized before executing statement S16.

In statement S16, the TABLE V program returns to the address stored in location "RET".

Checksum Generation

After the CCIP memory 504 has been written in accordance with TABLE V, the CCIP processor 525 is ready to commence the formation of a checksum. The checksum generation is controlled by console computer 501 which executes the TABLE VI program of instructions. The following TABLE VI program forms a checksum dependent upon the data values of all 65,536 points within the principal apparatus as masked by the contents of the 65,536 locations within the CCIP mask memory 504. The program of TABLE VI may be entered from any convenient source such as a master diagnostic program (not described) or from a manual command to the console computer 501.

TABLE VI

| CHECKSUM | | |
|---|---|---|
| S1 CKSUM: | STA | 3, RET |
| S2 | LDA | 0, OSRA |
| S3 | DOA | 0, CCI1 |
| S4 | LDA | 0, OSRV |
| S5 | DOBP | 0, CCI1 |
| S6 | LDA | 0, CKSA |
| S7 | DOA | 0, CCI1 |
| S8 | NIOP | CCI2 |
| S9 WTAS7: | DIA | 0, CCI2 |
| S10 | MOVS | 0,0 |
| S11 | MOVZR | 0,0, SNC |
| S12 | JMP | WTAS7 |
| S13 | DIA | 0, CCI1 |
| S14 | JMP | AT RET |
| S15 RET: | | 0 |
| S16 OSRA: | | 1 0 0 0 0 0 |
| S17 OSRV: | | 1 7 0 0 0 0 |

TABLE VI-continued

| CHECKSUM | |
|---|---|
| S18 CKSA: | 6 0 0 0 0 |

In statement S1 of TABLE VI, a return address in accumulator 3 is stored in the address RET at S15.

In statement S2, accumulator 0 is loaded with the contents of address OSRA, at S16. As indicated at S16, the value of OSRA is 1 0 0 0 0 (octal).

In statement S3, the contents of accumulator 0 are transmitted to the interface controller 511 and latched in the SAR register 574. Decoder 597 is operative to decode the octal code 1 0 0 0 0 0 to enable via line 621-8 the input gate 558 to the OSR register 558.

In statement S4, accumulator 0 is loaded with the contents of address OSRV, at S17. As indicated at S17, the value of OSRV is 1 7 0 0 0 0 (octal).

In statement S5, the 16-bit contents of accumulator 0 are transmitted to the interface controller 511 and latched into the ODR register 575. Also in S5, a load signal is generated on line 549 which energizes the gate 558 which together with the signal on line 621-8 latches the 16 bits from the ODR register 575 into the OSR register 557.

In statement S6, accumulator 0 is loaded with the contents of address CKSA, at S18. As indicated at S18, the value of CKSA is 6 0 0 0 0 (octal).

In statement S7, the contents of accumulator 0 are transmitted to the interface controller 511 and latched in the SAR register 574. Decoder 597 is operative to decode the octal code 6 0 0 0 0 to enable vial line 621-6 the sequencer 503.

In statement S8, a signal is generated on START line 550 which together with the signal on line 621-6 energizes the sequencer 503. The sequencer 503 then steps through the following states and causes the following actions:

State 1). The CLR CSR line 677 causes the CSR register 673 to be reset to all 0's. The CLR SADR lines 666 and 667 cause the SADR register 556 to be reset to all 0's.

All other output lines from sequencer 503 are deenergized. The deenergized state of the output lines DISABLE MEM 679 and DISABLE SCAN 678 causes the scanout data bus 591 and the memory data bus 534 to be logically OR'ED in the mask 505 and the result to be placed on the memory/scan bus 593. The output on each of the 128 lines of the memory data bus 534 is determined by the contents of the 128 cells of memory being addressed by the 9-bit scanout address bus 590. The 9-bit scanout address bus 590 also is an input to the scanout addressing logic of the log chips 611, for each of the MCC's of the principal apparatus in the manner shown in FIG. 8. The 9-bit address is transmitted from the SADR register, initially cleared to all 0's, over bus 590 to MCC's 601.

As indicated in connection with FIG. 8, the scanout addressing logic in the log chip 611 for each of the MCC's selects a single scan point on that MCC and places its data value (1 or 0) onto the scanout data bus 591 line assigned to that MCC. There is a one for one correspondence between cells in the CCIP memory 504 and points in the principal apparatus addressed by the address scanout on bus 590.

State 2). This state does not cause any changes on the sequencer 503 output lines. This state is a fixed delay state to allow time for the access of data from the principal apparatus and to allow the checksum generation logic 674 to form the next checksum for the CSR register 673 based upon the present state of the register 673 and the memory/scan bus 593.

State 3). The sequencer 503 energizes the LOAD CSR line 676 causing the CSR register 673 to be loaded with the next checksum determined by the checksum generation logic 674.

State 4). The sequencer 503 de-energizes the load CSR line 676, and, if the carry-out (CO) line 664 of SADR stage 556-20 is energized, enters state 7. If the CO line 664 is not energized the sequencer enters state 5.

State 5). The sequencer 503 energizes the INCR line 662 for SADR stage 556-2 causing the 9-bit count in SADR stage 556-2 to be incremented. When the SADR stages 556-2 reach the value 511 (decimal) and 1 1 1 1 1 1 1 1 1 (binary), it will cause the CO line 664 to be energized. When the CO line 664 is energized, 512 checksums have been loaded into CSR register 673 with the final checksum still there.

State 6). The sequencer 503 de-energizes the INCR line 662 for SADR stage 556-2 and enters state 2.

State 7). The sequencer 503 energizes the AS 7 line 680 indicating that the final checksum is complete and in the CSR register 673. THe sequencer 503 remains in this state until some new sequence is initiated.

In statement S9, the active state (AS) gate 582 is interrogated to allow the state of AS7 line 680 to be loaded into accumulator 0, bit 7.

In statement S10, the bytes in accumulator 0 are swapped, placing the state of AS7 line 680 into bit 15 of accumulator 0.

In statement S11, the state of AS7 bit 15 of accumulator 0 is checked and statement S12 is skipped if the AS& line 680 was energized when interrogated in statement S9.

In statement S12, which is executed if AS7 line 714 was not energized, the program jumps to statement S9 to re-interrogate the state of the AS7 line 680. In this way, the secondary processor 501 waits until the CCIP processor 525 signifies completion before proceeding.

In statement S13, accumulator 0 is loaded with the final checksum from the CSR register 673 which has been selected onto the IG gate 572 by the outgate 569-2 which was energized by decoder line 621-6, energized since the action of Statement S7.

In statement S14, the TABLE VI program of instructions jumps to the return address contained in location RET.

Compacted Scan

In forming the checksum in accordance with the program of TABLE VI, all 65,536 points within the principal apparatus were scanned. However, only the subset of points identified in memory 504 actually were capable of contributing to the checksums formed. If the actual checksum obtained from such a scan indicates that a fault condition exists, it is desirable to scanout a subset of points in the principal apparatus to determine the actual point or points within the subset causing the fault condition. Such a subset of points can be, for example, the subset of points associated with the FIG. 8 apparatus.

In order to perform a scanout of a selected subset of the points in the principal apparatus, the program of instructions in TABLE VII is executed by the console computer 501 in FIG. 2. The subset of points scanned out is the subset identified in the CCIP memory 504.

TABLE VII
COMPACTED SCAN

| | | | |
|---|---|---|---|
| S1 | CSCAN: | STA | 3, RET |
| S2 | | DOB | 0,CCI1 |
| S3 | | LDA | 0,SADRA |
| S4 | | DOAP | 0,CCI1 |
| S5 | | LDA | 0,OSRA |
| S6 | | DOA | 0,CCI1 |
| S7 | | LDA | 0,OSRV |
| S8 | | DOBP | 0,CCI1 |
| S9 | | LDA | 0,SADRA |
| S10 | | DOA | 0,CCI1 |
| S11 | | NIOP | CCI2 |
| S12 | WTAS7: | DIA | 0,CCI2 |
| S13 | | MOVS | 0,0 |
| S14 | | MOVZR | 0,0,SNC |
| S15 | | JMP | WTAS7 |
| S16 | | DIA | 1,CCI1 |
| S17 | | JMP | AT RET |
| S18 | RET: | 0 | |
| S19 | SADRA: | 120000 | |
| S20 | OSRA: | 100000 | |
| S21 | OSRV: | 170004 | |

Prior to entering the program of TABLE VII, accumulator 0 contains the complement of the 16-bit address which is desired to be the starting value of the compacted scan to be loaded into the SADR register 556. The TABLE VII program of instructions causes the sequencer 503 to control the CCIP processor 525 in such a way as to access 16 scan points in the principal apparatus and store their states in the SR register 670. The 16 points to be accessed are determined by the contents of the CCIP memory 504 in the following manner.

The CCIP Memory cell selected by the 16-bit contents of the SADR register 556 is read by the sequencer 503. If the contents of that cell is 0, the scan point within the main processor addressed by the SADR register 556 is accessed by multiplexer 668 and shifted into the SR register 670. The sequencer 503 counts in its counter the number of 0's read from CCIP memory 504, and if that count is 16, terminates. If the count is not 16 the SADR register 556 is incremented and the state of the CCIP memory cell addressed by the new value of the SADR register is read by the sequence. This sequence is repeated until the value of 16 scan points has been shifted into the 16-bit SR register 670.

In statement S1, a return address in accumulator 3 is stored in the address "RET" at S18.

In statements S2, S3 and S4 the SADR register 556 is initialized with the complement of the value specified in accumulator 0.

In statements S5, S6, S7 and S8 the OSR register 557 is initialized with the value 170004 (octal).

In statement S9, accumulator 0 is loaded from the location SADRA at S19 with the value 120000 (octal).

In statement S10, the contents of accumulator 0 are transmitted to the interface controller 511 and latched in the SAR register 574. Decoder 597 decodes the octal code 120000 to enable the sequencer 501 via line 621-10.

In statement S11, a signal is generated on the START line 550 which together with the signal on decoder line 621-10 causes the sequencer 503 to execute the compacted scan operation. The detailed sequencing of sequencer 503 is similar to that specified in connection with the checksum operation in connection with TABLE VI.

In statements S12 through S15 of TABLE VII, the code is indentical to that in TABLE VI statements S9 through S12 and performs the same function. Statement S16 of TABLE VII is not executed until the sequencer 503 has signaled completion of the sequence by energizing AS7 line 680.

In statement S16, the contents of the SR register 670 are transferred through the IG gate 572 into accumulator 1.

In statement S17, the TABLE VIII program returns to the address stored in location RET with the 16 values of scanpoints of the principal apparatus in accumulator 1.

Intermediate and Final Checksums

A specific example of the intermediate and final checksums for a particular state of the stage 330-2 of the IB register 330 of FIG. 8 will be described. It is assumed, for purposes of this example, that the stage 330-2 contains the 16 bits IB0, IB1, ..., IB15 defined by the hex number 47F0 which is the binary number 0100 0111 1111 0000. With these 16 bits stored in the stage 330-2 of FIG. 8, the odd parity bit IBP (0-7) is a 1 since there are an even number (4) of 1's in the stages IB:, IB1, ..., IB7. Similarly, the parity bit IBP (8-15) is also 1. It is also assumed for the present example, that all of the 10 control bits NSI0, NSI1, NSI2 and NSI3 are logically 0 so that they do not contain any logical ones which will effect the checksum description to follow. All of the intermediate checksums and the final checksum, IDFD (SADR (4-8) column "1F", SADR (0-3) row "F"), are shown in the following TABLE VIII. In TABLE VIII, the scan goes for each row of SDAR (0-3) for all thirty-two columns, that is, 00, 01, ..., 0F, 10, 11, ..., 1F, and then repeats all thirty-two columns for the next row.

TABLE VIII

| SADR 0-3 | SADR (4-8) | | | | | | | |
|---|---|---|---|---|---|---|---|---|
|  | 00 | 01 | 02 | 03 | 04 | 05 | 06 | 07 |
| 0 | 8020 | C010 | E008 | F004 | F802 | FC01 | 7E00 | BF00 |
| 1 | 0020 | 8010 | C008 | E004 | F002 | F801 | 7C00 | BE00 |
| 2 | 0E9E | 874F | 43A7 | 21D3 | 10E9 | 0874 | 843A | C21D |
| 3 | 0E9E | 874F | 43A7 | 21D3 | 10E9 | 0874 | 843A | C21D |
| 4 | 0EBE | 877F | 43BF | 21DF | 10EF | 0877 | 043B | 021D |
| 5 | 8EFE | C77F | 63BF | 31DF | 18EF | 0C77 | 063B | 031D |
| 6 | 8EDE | C74F | 63A7 | 31D3 | 18E9 | 0C74 | 863A | C31D |
| 7 | 0E9E | 874F | 43A7 | 21D3 | 10E9 | 0874 | 843A | C21D |
| 8 | 0EBE | 877F | 43BF | 21DF | 10EF | 0877 | 043B | 021D |
| 9 | 0EFE | 877F | 43BF | 21DF | 10EF | 0877 | 043B | 021D |
| A |  |  |  |  |  |  |  |  |
| B |  |  |  |  |  |  |  |  |
| C |  |  |  |  |  |  |  |  |
| D |  |  |  |  |  |  |  |  |
| E |  |  |  |  |  |  |  |  |
| F | 0EFE | 877F | 43BF | 21DF | 10EF | 0877 | 043B | 021D |

| SADR 0-3 | 08 | 09 | 0A | 0B | 0C | 0D | 0E | 0F |
|---|---|---|---|---|---|---|---|---|
| 0 | DF80 | EFC0 | F7C0 | FBE0 | FDF0 | FEF8 | FF7C | FFBE |
| 1 | DF00 | EF80 | F7C0 | FBE0 | FDF0 | FEF8 | FF7C | FFBE |
| 2 | 610E | B087 | 5843 | 2C21 | 1610 | 8B08 | C584 | E2C2 |
| 3 | 610E | B087 | 5843 | 2C21 | 1610 | 8B08 | C584 | E2C2 |
| 4 | 010E | 8087 | 4063 | 2031 | 1018 | 880C | C406 | E203 |
| 5 | 018E | 80C7 | 4063 | 2031 | 1018 | 880C | C406 | E203 |
| 6 | 618E | B0C7 | 5843 | 2C21 | 1610 | 8B08 | C584 | E2C2 |
| 7 | 610E | B087 | 5843 | 2C21 | 1610 | 8B08 | C584 | E2C2 |
| 8 | 010E | 8087 | 4043 | 2021 | 1010 | 8808 | C404 | E202 |
| 9 | 101E | 8087 | 4043 | 2021 | 1010 | 8808 | C404 | E202 |
| A |  |  |  |  |  |  |  |  |
| B |  |  |  |  |  |  |  |  |
| C |  |  |  |  |  |  |  |  |
| D |  |  |  |  |  |  |  |  |
| E |  |  |  |  |  |  |  |  |
| F | 010E | 8087 | 4043 | 2021 | 1010 | 8808 | C404 | E202 |

| SADR 0-3 | SADR (4-8) | | | | | | | |
|---|---|---|---|---|---|---|---|---|
|  | 10 | 11 | 12 | 13 | 14 | 15 | 16 | 17 |
| 0 | FFDF | 7FEF | 3FF7 | 1FFB | 0FFD | 07FE | 83FF | 41FF |
| 1 | FFDD | 7FEC | BFF4 | DFF8 | EFFE | F7FF | 7BFD | 3DFE |
| 2 | F161 | 78B0 | BC58 | DE2C | EF16 | F78B | 7BC5 | 3DE2 |
| 3 | F161 | 78B0 | BC58 | DE2C | EF16 | F78B | 7BC5 | 3DE2 |
| 4 | 7101 | 3880 | 9C40 | CE20 | E710 | F388 | F9C4 | FCE2 |
| 5 | 7101 | 3880 | 9C40 | CE20 | E710 | F388 | F9C4 | FCE2 |
| 6 | F161 | 78B0 | BC58 | DE2C | EF16 | F78B | 7BC5 | 3DE2 |
| 7 | F161 | 78B0 | BC58 | DE2C | EF16 | F78B | 7BC5 | 3DE2 |
| 8 | F101 | 7880 | BC40 | DE20 | EF10 | F788 | FBC4 | FDE2 |
| 9 | F101 | 7880 | BC40 | DE20 | EF10 | F788 | FBC4 | FDE2 |
| A |  |  |  |  |  |  |  |  |
| B |  |  |  |  |  |  |  |  |
| C |  |  |  |  |  |  |  |  |
| D |  |  |  |  |  |  |  |  |
| E |  |  |  |  |  |  |  |  |
| F | F101 | 7880 | BC40 | DE20 | EF10 | F788 | FBC4 | FDE2 |

| SADR 0-3 | 18 | 19 | 1A | 1B | 1C | 1D | 1E | 1F |
|---|---|---|---|---|---|---|---|---|
| 0 | 20FF | 107F | 083F | 041F | 020F | 0107 | 0083 | 0041 |
| 1 | 9EFD | 4F7C | A7BC | D3DE | E9EF | 74F7 | 3A7B | 1D3D |
| 2 | 9EF1 | 4F78 | A7BC | D3DE | E9EF | 74F7 | 3A7B | 1D3D |
| 3 | 9EF1 | 4F78 | A7BC | D3DE | E9EF | 74F7 | 3A7B | 1D3D |
| 4 | FE71 | 7F38 | BF9C | DFCE | EFE7 | 77F3 | 3BF9 | 1DFC |
| 5 | FE71 | 7F38 | BF9C | DFCE | EFE7 | 77F3 | 3BF9 | 1DFC |
| 6 | 9EF1 | 4F78 | A7BC | D3DE | E9EF | 74F7 | 3A7B | 1D3D |
| 7 | 9EF1 | 4F78 | A7BC | D3DE | E9EF | 74F7 | 3A7B | 1D3D |

TABLE VIII-continued

| | | | | | | | | |
|---|---|---|---|---|---|---|---|---|
| 8 | FEF1 | 7F78 | BFBC | DFDE | EFEF | 77F7 | 3BFB | 1DFD |
| 9 | FEF1 | 7F78 | BFBC | DFDE | EFEF | 77F7 | 3BFB | 1DFD |
| A | | | | | | | | |
| B | | | | | | | | |
| C | | | | | | | | |
| D | | | | | | | | |
| E | | | | | | | | |
| F | FEF1 | 7F78 | BFBC | DFDE | EFEF | 77F7 | 3BFB | 1DFD |

In TABLE VIII, the rows define the 4 low-order bits of the SADR register stage 556-2 in hexadecimal code. The columns in TABLE VIII define the high-order 5-bits (4 through 8) of the SADR register stage 556-2 in hexadecimal code.

The row and column designations in TABLE VIII correspond to the 9-bit address which is transmitted to each MCC in the manner described in connection with FIG. 8. The firsr MCC bit address appears in the upper left-hand corner of TABLE VIII.

Referring to TABLE III, the all 0's 0 MCC address for MCC 601-1 of FIG. 8 addresses the parity bit IBP (0-7). Since the parity bit IBP (0-7) for odd parity is a logical 1 when the IB register contains the data 47F0 (HEX) the log chip 611-1 returns a logical 1 on its output in response to the all 0's 9-bit address. The logical 1 from log chip 611-1 of FIG. 8 appears as one bit on the 128-bit bus 591. The bus 591 from FIG. 8 connects as an input to the mask 505 of FIG. 4. At this time, the 128 lines 678 to the 128-way gate 539 carry a logical 0. The logical 1 data value for the IBP (0-7) bit from the log chip 611-1 of FIG. 8 is inverted in the gate 539 and appears as a logical 0 to the OR gate 538. The corresponding data value from the CCIP memory, through gate 547 in FIG. 4, is a 0 as is evident from TABLE III. The 0 from gate 547 and the 0 from gate 539 are combined in OR gate 538 to provide a 0 on the one of the lines of the bus 593 corresponding to the output from the log chip 611-1. At the same time, all of the other 127 outputs from the CCIP memory 504 and the gate 547 are logical 1's so that only a single logical 0 appears on the bus 593.

In FIG. 7, the particular line, in the FIG. 8 example being described which contains a 0 is line 33 (not explicitly shown) in the group of lines 32-39 of bus 593. All other inputs on bus 593 are logical 1's. The 0 on line 33 connects to the 8-way EXCLUSIVE-OR gate 681-2. One of the eight outputs from gate 681-2 is therefore a logical 1 while the other seven outputs are logical 0's. The logical 1 output from gate 681-2 in turn provides an input to the 8-way EXCLUSIVE-OR gate 681-2 which in turn provides a logical 1 output on one of its eight outputs, for example, bit 1. That logical 1 output from gate 681-2 in turn is one input to the 4-way EXCLUSIVE-OR gate 681-2. Accordingly, one of the four outputs from gate 683-2 is a logical 1. That logical 1 output from gate 683-2 provides a logical 1 as an input to the EXCLUSIVE-OR gate 684-9 (not explicitly shown in FIG. 7).

Since the CSR register 673 was cleared to all 0's prior to the first SADR register address, the output from EXCLUSIVE-OR gate 684-9 is a logical 1. That logical 1 is loaded into CSR register stage 673-10 (not explicitly shown in FIG. 7). At the same time, the logical 0 from the CSR register stage 673-15 is combined with a 0 from the 4-way gate 683-1 as an input to the EXCLUSIVE-NOR gate 684-15. The output from gate 684-15 is, therefore, a logical 1, which in turn is loaded into the CSR register stage 673-0.

The result of the previous operations forms the first intermediate checksum with a logical 1 in the CSR register stage 673-0 and a logical 1 in the CSR register stage 673-10 with all other stages of register 673 having 0's. The hexadecimal representation of the contents of the intermediate checksum in register 673 is 8020 as shown in TABLE VIII at HEX address 0 00. If an error had occurred so that the parity bit IBP (0-7) had been a logical 0 rather than the expected logical 1, then no logical 1 would have been propagated through the EXCLUSIVE-OR checksum logic 674 of FIG. 7. Accordingly, no 1 would have been loaded into the CSR register stage 673-10 and hence the contents of the checksum register would have been 8000 (HEX) rather than 8020 (HEX).

At this point in time, the sequencer 503 of FIGS. 5 and 6 will have completed one complete sequence of the time-state register 696. At the output of stage 696-4 in FIG. 6, the SADR stage 556-2 is incremented to the next count which is 001 (HEX).

Referring again to TABLE III, the MCC bit address 001 (HEX) for the MCC containing the IB register 330 in FIG. 8 corresponds to bit IB0. As indicated in TABLE III, the output from the CCIP memory usng the 9-bit address appearing in the SADR register stage 556-2 produces a logical 0 to the gate 547. When the IB register contains the data 47F0 (HEX) the value for IB0 is a logical 0. That logical 0 is, referring to FIG. 8, returned as the output from the log chip 611-1 onto one bit of the 128-bit bus 591. The 0 on bus 591 is inverted in the gate 539 and appears) as a logical 1 as an input to OR gate 530. Even though the output from the CCIP memory 540 is a logical 0, propagated as a 0 through gate 547, the output from gate 538 corresponding to bit IB0 is a logical 1. Since all other 127 outputs from gate 547 are also logical 1's, the content of bus 593 is all 1's.

The all-1's input on bus 593 to the checksum logic 674 of FIG. 7 provides an all-0 input to the last level of EXCLUSIVE-OR's 684. Accordingly, the 1 which was located in stage 673-0 is shifted through gate 674-0 as a 1 into stage 673-1. The 1 which was in shift register stage 673-10 is shifted and becomes a 1 in shift register stage 673-11. The 0 which was in shift register stage 673-15 is inverted in gate 684-15 and becomes a new 1 in shift register stage 673-0.

The result is the second intermediate checksum, C010, as is indicated in TABLE VIII for address 0 01 (HEX). At this point, a new intermediate checksum must be generated and the sequencer 503 of FIGS. 5 and 6 causes the SADR register to be incremented to the next address 002 (HEX). Thereafter, for each of the addresses 002 (HEX) through 009 (HEX) the outputs from the CCIP memory 504 are all 1's so that no data value returned from the principal apparatus is of interest. The intermediate checksum and the contents of the CSR register after the SADR address 009 (HEX) are EFC0. As indicated in TABLE III, the next address for the SADR register, 00A (HEX), is of interest and a 0 is accessed from the CCIP memory. The data value for the IB1 bit is a 1 and the IB register stores the value 47F0 (HEX). The reason IB1 is a logical 1 is because in the value 4 (HEX) the binary equivalent 0100 has a 1 in the second, that is IB1, location. That 1 from the IB1 location of FIG. 8 is propagated back through the checksum logic 674, is inverted to a 0 in the gate 539, and, together with the 0 from gate 547 appears as a 0 input on the line 33 of FIG. 7. That 0 is propagated through the checksum logic 674 to provide a logical 1 input to the EXCLUSIVE-OR gate 684-9. That 1 combined with a logical 1 from the CSR stage 673-9 produces a logical 0 input which is stored in the CSR stage 673-10. Accordingly, the intermediate checksum, the SADR register at address 009 (HEX), is F7C0.

If a logical 1 had not been obtained from the IB1 bit in FIG. 8, then the intermediate checksum for address 00A (HEX) would have been F7E0 (HEX). Thereafter, the intermediate checksums are formed in the register 673 of FIG. 7 for each of the addresses remaining in TABLE III. TABLE III only represents 16 of the total 512 checksums which must be formed. All of the addresses including those of TABLE II are scanned as part of the total 512 addresses in a manner described to this part in connection with TABLE III. Each of the intermediate checksums appear in TABLE VIII for all 512 scans. The final checksum appearing at address F1F (HEX) is 1DFD. It should be noted that the checksums become repetitive on a modulus 32 checksum basis if there is no change in the data input. The repetition is observed in that there is no change in the intermediate checksums for each of the rows A (HEX) through F (HEX) of TABLE VIII.

While the final checksum for the IB register containing the data value 47F0 is 1DF0 as described above, the final checksum for the IB register having the data content 46F0 (HEX), with IBP (0–7) equal to 1 and IBP (8–15) equal to 1 would be 1DFC (HEX).

Further and Other Embodiments

The generator 507 of FIG. 4 includes reduction logic 674-1, a checksum register 673 and checksum logic 674-2. While the reduction logic was described in connection with FIG. 7 as a binary tree circuit, a tree circuit, of course, is not required. Any number of logically dependent outputs can be derived from the inputs with any tree or nontree form of reduction. The reduction can be from N input bits where N is any integer, to one or more output bits. The checksum logic, which logically combines the present checksum stored in the checksum register with the output from the reduction logic, also may be of various different forms. For example, in the extreme case, the reduction logic can reduce the output to a single bit. Whatever the number of output bits, they are combined with the output from the checksum register. The checksum register itself can also consist of one or more bits.

In the preferred embodiment of a checksum generator described in connection with FIG. 7, the checksum logic 674-2 included a transformation circuit means including an inverter for connecting the output from the EXCLUSIVE-OR gate 684-15, which receives an output from the shift-register Nth stage 673-15, to provide an inverted input to the shift-register first stage 673-0. Of course, other cyclic redundancy check techniques may be employed in accordance with the present invention. For example, the transformation circuit means may connect and logically combine the output from the inverter 785 with the output from stage 673-14 to form an input to the last stage 673-15. Any cyclic redundancy check techniques may be employed within the checksum generator of the present invention.

The checksum generator 507 of FIG. 4 and FIG. 7 has been described as a single unit for all points throughout the principal apparatus. As an alternative, the checksum generator can be distributed to different locations. For example, each of the 128 MCC's which comprise one principal apparatus can include its own checksum generator. Each such checksum generator can function to generate an intermediate checksum. The intermediate checksums from the MCC's may be thereafter logically combined to form a single final checksum. The checksum in each case can comprise one or more bits which are transmitted to the secondary apparatus either serially or in parallel. The nature of the addressing apparatus for addressing groups of points which are utilized to form intermediate checksums, will of course, depend on the particular distribution selected. In such alternative embodiments, each MCC can include its own subset identification memory, like the MCC memory 504 of FIG. 4, or alternatively, the masking function can remain entirely in the processor 525.

Although the memory 504 has been described in one embodiment where there is a one-for-one correlation between bit locations in the memory and points in the principal apparatus, the memory can be any other type of a transformation device. For example, rather than a one-for-one correlation, the memory may store identification values in an encoded form. In such an embodiment, encoded information is addressed and decoded to provide the desired memory output. By using encoded information, the size of the memory can be reduced.

While the present invention has been directed toward detecting faults of points within a principal apparatus, the present invention can also be employed in connection with points in the secondary apparatus. For example, in FIG. 3, the processor gates 523 connect to many points (not shown) throughout the processor 525. Any of those points can be appropriately accessed through gate 569-6 for connection through controller 511 to the computer 501 of FIG. 2. In this manner, fault detection or analysis within the secondary apparatus by the secondary apparatus can be carried out.

In the present invention, faults are not detected with absolute certainty because of the nature of the logical reduction which is employed. If an odd number of faults occur simultaneously in the register 330 of FIG. 8, a fault will be detected by the present invention. On the other hand, if an even number of faults occur simultaneously, the faults may be offsetting and hence a possibility exists that no fault detection will result in the cycle of occurrence. The probability of detection increases in subsequent cycles. In the case where exactly two simultaneously occurring faults are randomly located in the principal apparatus, the probability that such offsetting will occur in one cycle is approximately 6.3 percent. In the cases where more than two randomly-located faults occur, the probability that such offsetting will occur rapidly decreases with the number of faults, that is the probability of fault detection rapidly increases with increasing numbers of faults.

In a principal apparatus of the type described in connection with the present invention, the processing of information occurs in sequential synchronous cycles of the principal apparatus. In order to do fault detection and analysis, it is desirable to locate the first cycle during which a fault occurs since there is a high probability that in subsequent cycles the fault becomes propagated and compounded. Usually the more cycles which have elapsed since the initial fault, the more difficult it becomes to isolate the initial cause of the fault.

The probability of detecting an error on the first or on subsequent cycles is of interest in evaluating the power of the present invention. In accordance with one analysis, the probability of detecting a fault in the cycle in which the fault first occurred is greater than 99 percent. Furthermore, the probability is increasingly better that the fault will be detected in subsequent cycles of the principal apparatus.

One way in which the principal apparatus and the secondary apparatus of the present invention work together is as follows. The principal apparatus operates to process information, for example to execute a known principal program such as a diagnostic program, in a conventional manner until conventional error detecting techniques signify that the principal apparatus has a fault. Such fault detection can be, for example, from normal parity error detection techniques. Upon a fault indication of any kind in the principal apparatus, a command is given either automatically or under program control to the console computer 501. The cycle count of the principal apparatus is stored upon detection of the first fault. The principal apparatus is then commanded to retry the operation which gave rise to the error indication for some initial period. The initial period is any number of cycles counted by a principal apparatus cycle counter. When the cycle counter approaches a count which precedes the count where faults were first detected, the principal apparatus is halted in a conventional manner. Thereafter, checksums for each cycle of the principal apparatus are formed and compared by the secondary apparatus. When the actual value of a checksum formed differs from the expected value of a checksum, a compacted scan analysis of the points contributing to that checksum can be carried out to further attempt to identify the source of the fault. The number of points initially contributing to the checksum cam be all 65,536 points or any selected subset of those points.

For example, if the normal error detection circuitry of the principal apparatus has indicated that the error occurred only in connection with the execution unit 10 of FIG. 1, then a subset of points entirely within the execution unit 10 are selected and all other points are masked. Of course, those skilled in the art will understand the many variations which can be implemented using the present invention.

The present invention normally requires that a known state of the principal apparatus exists prior to the fault detection and analysis. Therefore, any principal program or principal apparatus operation must be one which has been previously documented as fault-free in order to provide the expected values for storage in the secondary apparatus.

In the present invention, expected values of checksums are stored and accessible by the console computer 501 of FIG. 2. Also, expected values for the states of individual points within the principal apparatus are also stored and accessible by the console computer 501. If a comparison of checksum does not detect a fault, then the stored values of points which contributed to the formation of the checksum need not be further analyzed. If a comparison of actual and expected checksums indicates that a fault exists within the subset of points contributing to the checksum, then the expected values of those points and the actual values of those points may be compared by computer 501. In the embodiment described, the expected values of a subset of points are accessed in groups of 16 bits at a time and stored in the shift register 696. Those 16 bits are then transferable through the out gates 508 through the controller 511 to the computer 501. Computer 501, in a conventional manner, then compares those 16 bits with the corresponding 16 bits of computer 501 which are the expected values. If the group of 16 actual bits corresponds to the values of the 16 expected bits, then the processor 525 can continue to access the next group of 16 bits. Normally, if no error is detected in any 16-bit group, the accessed values for the 16-bit group may be discarded without further analysis. If an error is detected between any value of an expected bit and an actual bit, the detected error can be further analyzed to determined the loation in the principal apparatus.

The storing of expected values for both the checksums and for the bit values can be carried out using the apparatus of the present invention. The principal apparatus is permitted to operate to any state for which a checksum and expected values are to be formed. Thereafter, all of the expected values are accessed from the principal apparatus and stored in the memory associated with computer 501. Similarly, the checksum formed is stored in an appropriate location. When the pirncipal apparatus is again returned to the same state, the required expected values have already been stored in the secondary apparatus.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A fault-detecting apparatus for processing information useful for detecting faults in the operation of a principal apparatus where the principal apparatus includes a plurality of principal circuit points each having a digital expected state and a digital actual state at any one point in time during the operation of said principal apparatus where the state of each said principal circuit point is faulty if the corresponding actual state is not the same as the expected state, said fault-detecting apparatus comprising, a secondary apparatus for processing state information independently from said principal apparatus without altering the actual states of said principal circuit points, said secondary apparatus including, accessing means, connected to said pincipal circuit points, for accessing state information at said one point in time indicating the actual states of said principal circuit points, subset means for causing said state information from said accessing means to include the actual states of only a subset of said principal circuit points, said subset means including a memory for storing identification values for identifying said subset of said principal circuit points, and including means for selecting said data information to include the actual states of said subset of principal circuit points identified in said memory, generator means connected to receive said state information from said subset means for generating an actual checksum having a value dependent upon the actual states of said subset of said principal circuit points, and means for storing an expected checksum having a value determined by the expected states at said one point in time of said subset of said principal circuit points whereby the expected checksum can be compared with the actual checksum for detecting faults in the principal apparatus.

2. The apparatus of claim 1 including,
means for storing the expected states of the subset of principal circuit points whereby said expected states can be compared with the actual states to detect faults in the principal apparatus.

3. A data processing apparatus for processing digital information and for fault location comprising,
a principal apparatus including a plurality of principal circuit points each having an expected state and an actual state at any one point in time during the operation of said principal apparatus where each circuit point is error-free if the corresponding actual state is the same as the expected state, and
a secondary apparatus for processing information independently from said principal apparatus without altering said actual state, said secondary apparatus including,
a programmable digital computer means responsive to a secondary program for controlling said secondary apparatus,
interface processor means, connected between and for interfacing said computer means and said principal apparatus, and including addressing means for addressing in parallel a group of said principal circuit points in response to said secondary program,
accessing means, connected to said principal circuit points, for accessing state information from an addressed group of said principal circuit points for indicating the actual states of said principal circuits,
generator means connected to receive said state information accessed by said accessing means, for generating an actual checksum having a value dependent upon the actual states of principal circuit points, said generator means including reduction logic means for logically combining said state information from said accessing means to form a reduced representation, a checksum register for storing a present checksum, and checksum logic for logically combining the present checksum and the reduced representation to form said actual checksum,
a memory for storing an expected checksum having a value determined by the expected states of the principal circuit points, and
means for connecting said memory to said digital computer means to compare the actual checksum with the expected checksum for detecting faults in the principal apparatus.

4. The data processing apparatus of claim 3 including subset mens connected to said accessing means for selecting state information to include the actual states of only a subset of said principal circuit points thereby causing said actual checksum to have a value dependent upon the actual states of only said subset of said plurality of principal circuit points.

5. In a digital apparatus having a principal apparatus including a plurality of principal circuit points each having an expected state and an actual state at any point in time during the operation of said principal apparatus where each point is fault-free if the actual state is the same as the expected state and including a secondary apparatus for processing information independently from said principal apparatus without altering said actual states, the method comprising,
accessing, with accessing circuitry means connected to said principal circuit points, state information indicating the actual states of only a subset of said principal circuit points independently from the operation of said principal apparatus and without altering said actual states of said principal circuit points,
generating, with generating circuitry means connected to receive said state information from said accessing circuitry means, an actual checksum having a value dependent upon the state information indicating the actual states of said principal circuit points, and
comparing, with comparing means connected to receive said actual checksum from said generating circuitry means and an expected checksum from an expected checksum store, the actual checksum with an expected checksum to detect faults in the principal apparatus.

6. In the apparatus of claim 5, the step of storing information indicating the actual states of said subset of circuit points.

7. In the apparatus of claim 6, the step of comparing the actual states with the expected states of said subset of circuit points.

8. A fault-detecting apparatus for processing information useful for detecting faults in the operation of a principal apparatus where the principal apparatus includes a plurality of principal circuit points each energized to a digital actual state at any one point in time during the operation of said principal apparatus, said fault-detecting apparatus comprising,
a secondary apparatus for processing state information independently from said principal apparatus without altering the actual states of said principal circuit points, said secondary apparatus including accessing means, connected to said principal circuit points, for accessing state information at said one point in time indicating the actual states of said principal circuit points, including subset means for causing said state information from said accessing means to include the actual states of only a subset of said principal circuit points, including generator means connected to receive said state information from said subset means for generating an actual checksum having a value dependent upon the actual states of said subset of said principal circuit points, and including means for storing an expected checksum having a value determined by the expected states at said one point in time of said subset of said principal circuit points whereby the expected checksum can be compared with the actual checksum for detecting faults in the principal apparatus.

9. The system of claim 8 wherein said subset means includes a memory having locations corresponding to said principal circuit points in said principal apparatus, said locations storing identification values for indicating the subset of said principal circuit points to be used in the formation of the actual checksum and includes means responsive to said memory for selecting said subset of said principal circuit points.

10. The apparatus of claim 8 wherein said secondary apparatus includes, a programmable digital computer means responsive to a secondary program for controlling said secondary apparatus, and interface means, connected between and for interfacing said computer means and said principal apparatus, said interface means including addressing means for addressing in parallel a group of said principal circuit points in response to said secondary program whereby said accessing means accesses information indicating the actual states of said group of said principal circuit points to provide an input to said generator means.

11. The apparatus of claim 10 wherein said addressing means further includes a scanout address data register, connected when enabled to said computer means, and includes a scanout address bus connected from said address data register to address a different group of principal circuit points for each address in the scanout address data register, each of said points in a group associated with a different scanout data line where the scanout data lines together form a scanout data bus for accessing in parallel information indicating the actual states of principal circuit points in the addressed group, said scanout data bus providing an input to said generator means for each addressed group.

12. The apparatus of claim 11 further including, a plurality of integrated circuit chips each containing a plurality of said principal circuit points, a plurality of chip carriers each containing an associated plurality of said chips, each containing a number of said principal circuit points, and each connected to receive said address bus and to provide a scanout data line to said scanout data bus, means associated with each chip carrier for addressing one of the associated plurality of said chips in response to information on said address bus, and means on each of said chips responsive to said address bus for addressing a specified principal circuit point on said chip and for connecting each addressed principal circuit point to the scanout data line of said scanout data bus whereby each of said chips provides information for said generator means.

13. The apparatus of claim 10 wherein said secondary apparatus includes, an addressable memory having storage bit locations, corresponding one-for-one with said plurality of principal circuit points, for identifying said subset of said principal circuit points, said memory connected to be addressed by said addressing means to provide identification values corresponding to said addressed group of said principal circuit points, and means for combining the information indicating the actual states of said addressed group of said principal circuit points with the corresponding identification values accessed from said memory to provide inputs to said generator means whereby only the identified subset of said principal circuit points affects the actual checksum generated by said generator means.

14. The apparatus of claim 13 wherein subset identification values are stored in the storage locations of said memory under control of the secondary program of instructions.

15. The apparatus of claim 8 wherein said generator means includes, reduction logic means for logically combining the state information from said subset means to form a reduced representation, a checksum register for storing a present checksum, and checksum logic means for logically combining the present checksum and the reduced representation to form said actual checksum.

16. The apparatus of claim 15 wherein said checksum register is a shift register having a plurality of stages where the inputs to one or more of said stages are connected through said checksum logic means from one or more outputs of said stages.

17. The apparatus of claim 15 including a sequencer operative to cause said secondary apparatus to access first, second, subsequent and final groups of said points to cause said checksum register to store first, second, subsequent and final checksums whereby said final checksum is said actual checksum and is logically dependent upon the first, second and subsequent checksums.

18. The apparatus of claim 15 wherein said reduction logic means comprises an EXCLUSIVE-OR tree circuit and wherein said checksum logic means includes a plurality of EXCLUSIVE-OR gates for providing the EXCLUSIVE-OR combination of the present checksum and said reduced representation.

19. The apparatus of claim 18 wherein said tree circuit provides an N-bit output, wherein said checksum register includes N stages each having an input and an output, and wherein said checksum logic means includes N EXCLUSIVE-OR gates each for combining a different one of the outputs from said tree circuit and a different one of the outputs of the N stages, said EXCLUSIVE-OR gates providing N outputs, said checksum logic means including transforming means for connecting the outputs from said EXCLUSIVE-OR gates as inputs to said N stages where B is an integer greater than one.

20. The apparatus of claim 19 wherein said transforming means includes one or more inverters for inverting the inputs or outputs from one or more of said EXCLUSIVE-OR gates.

21. The apparatus of claim 20 wherein said tree circuits is a binary tree circuit having $2^Y$ inputs and $2^X$ outputs where X and Y are integers where the integer X is less than the integer Y.

22. The apparatus of claim 8 including, a memory having a plurality of memory fields, each memory field for storing a subset identification vlaue as a selected value or an unselected value, each of said memory field associated with a corresponding principal circuit point, and means for logically combining the outputs from one or more memory fields with the state information accessed by said access means from one or more corresponding principal circuit points to form corresponding data values as said state information input to said generator means, whereby each one of said data values corresponds to said unselected value for each memory field storing an unselected value and corresponds to the principal circuit point actual state for each memory field storing a selected value.

23. The apparatus of claim 8 including, a memory having a plurality of bit locations, one for each principal circuit points, said bit locations storing subset identification values for identifying said subset of said points, addressing means for addressing in parallel a group of said principal circuit points whereby said accessing means accesses information indicating the actual states of said group of said principal circuit points, register means for storing information, and control means for enabling said register means to store state information indicating the actual states of any points of said subset of points within said group of points.

24. The apparatus of claim 23 including sequencer means for sequencing said addressing means to sequentially address all points within said subset of points whereby said register means sequentially stores information indicating the actual states of all points within said subset of points.

UNITED STATES PATENT AND TRADEMARK OFFICE
CERTIFICATE OF CORRECTION

PATENT NO. : 4,142,243
DATED : February 27, 1979
INVENTOR(S) : Bishop, Richard L.; and Gibson, William A.

It is certified that error appears in the above-identified patent and that said Letters Patent are hereby corrected as shown below:

Claim 4, column 31, line 57, between "subset" and "connected", please delete "mens" and substitute therefor—means—.

Claim 5, column 31, line 66, between "any" and "point", please insert—one—.

Claim 19, column 34, line 39, between "where" and "is", please delete "B" and subsitute therefore—N—.

Claim 23, column 34, line 68, between "each" and "principal", please insert—said—.

Signed and Sealed this

Fifth Day of June 1979

[SEAL]

Attest:

RUTH C. MASON
*Attesting Officer*

DONALD W. BANNER
*Commissioner of Patents and Trademarks*